United States Patent
Ruble et al.

(10) Patent No.: US 10,347,017 B2
(45) Date of Patent: Jul. 9, 2019

(54) INTERACTIVE CONTROLS THAT ARE COLLAPSIBLE AND EXPANDABLE AND SEQUENCES FOR CHART VISUALIZATION OPTIMIZATIONS

(71) Applicant: MICROSOFT TECHNOLOGY LICENSING, LLC, Redmond, WA (US)

(72) Inventors: B. Scott Ruble, Bellevue, WA (US); Catherine W. Neylan, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 40 days.

(21) Appl. No.: 15/043,176

(22) Filed: Feb. 12, 2016

(65) Prior Publication Data

US 2017/0236312 A1    Aug. 17, 2017

(51) Int. Cl.
    *G06T 11/20*    (2006.01)
    *G06F 9/451*    (2018.01)

(52) U.S. Cl.
    CPC .......... *G06T 11/206* (2013.01); *G06F 9/451* (2018.02)

(58) Field of Classification Search
    CPC ......... G06T 11/30; G06T 3/40; G06T 11/206; G06F 9/451
    See application file for complete search history.

(56) References Cited

U.S. PATENT DOCUMENTS

| | | | | |
|---|---|---|---|---|
| 4,674,042 A | * | 6/1987 | Hernandez | G06T 11/206 345/440 |
| 4,674,043 A | * | 6/1987 | Hernandez | G06F 17/246 345/440 |
| 5,050,221 A | * | 9/1991 | Ohta | G06F 17/246 382/177 |
| 5,461,708 A | * | 10/1995 | Kahn | G06F 17/246 345/440 |

(Continued)

FOREIGN PATENT DOCUMENTS

| | | |
|---|---|---|
| EP | 0350353 | 1/1990 |
| EP | 1465114 | 10/2004 |

OTHER PUBLICATIONS

Muñoz, Arturo., "Qlik Sense Search Cheat Sheet", Published on: Oct. 2, 2015 Available at: https://community.qlik.com/blogs/qlikviewdesignblog/authors/amz.

(Continued)

*Primary Examiner* — Devona E Faulk
*Assistant Examiner* — Charles L Beard
(74) *Attorney, Agent, or Firm* — Workman Nydegger

(57) ABSTRACT

Various methods, systems and storage devices are provided for sequencing chart visualization optimizations that include reducing a chart visualization to a single displayed value. Various methods, systems and storage devices are also provided for creating and utilizing an interactive control that is dynamically created in response to one or more chart elements being removed from a chart visualization during optimization of the chart visualization and that is operable, when selected and expanded, for accessing the removed one (Continued)

or more chart elements. Later, the one or more chart elements are removed from the chart visualization again by collapsing the interactive control.

20 Claims, 11 Drawing Sheets

(56) References Cited

U.S. PATENT DOCUMENTS

| | | | | |
|---|---|---|---|---|
| 5,502,805 | A * | 3/1996 | Anderson | G06F 3/0481 715/209 |
| 5,537,522 | A * | 7/1996 | Shibuta | G06T 11/206 345/441 |
| 5,557,716 | A * | 9/1996 | Oka | G06T 11/206 345/440 |
| 5,561,757 | A | 10/1996 | Southgate | |
| 5,596,691 | A * | 1/1997 | Good | G06T 11/206 345/440 |
| 5,634,133 | A * | 5/1997 | Kelley | G06T 11/206 345/440 |
| 5,751,283 | A | 5/1998 | Smith | |
| 5,784,067 | A | 7/1998 | Ryll et al. | |
| 5,917,499 | A * | 6/1999 | Jancke | G06T 11/206 345/440 |
| 6,392,662 | B1 * | 5/2002 | Bou | G06F 3/0481 178/18.01 |
| 6,704,016 | B1 * | 3/2004 | Oliver | G06F 3/0485 345/440.2 |
| 6,774,899 | B1 * | 8/2004 | Ryall | G06T 11/206 345/440 |
| 6,812,926 | B1 * | 11/2004 | Rugge | G06T 11/206 283/115 |
| 7,027,628 | B1 * | 4/2006 | Gagnon | G01N 15/1463 382/128 |
| 7,194,697 | B2 * | 3/2007 | Sinclair, II | G06T 3/40 345/660 |
| 7,287,234 | B2 * | 10/2007 | Leah | G06T 11/206 345/589 |
| 7,362,804 | B2 * | 4/2008 | Novotny | H04N 19/70 375/240.01 |
| 7,627,517 | B2 | 12/2009 | Badenhorst et al. | |
| 7,783,708 | B2 | 8/2010 | Zaner-Godsey et al. | |
| 7,917,382 | B2 * | 3/2011 | Cereghini | G06Q 30/02 705/7.29 |
| 7,949,954 | B1 * | 5/2011 | Jezek, Jr. | G06F 3/048 715/800 |
| 7,961,188 | B2 * | 6/2011 | Tolle | G06Q 10/10 345/440 |
| 8,068,121 | B2 * | 11/2011 | Williamson | G06F 1/1626 345/619 |
| 8,219,453 | B1 * | 7/2012 | Iida | G06Q 30/0601 705/26.1 |
| 8,239,765 | B2 * | 8/2012 | Alsbury | G06F 1/1626 715/273 |
| 8,452,785 | B1 * | 5/2013 | Iida | G06Q 30/0601 705/26.7 |
| 8,527,909 | B1 * | 9/2013 | Mullany | G06F 3/0484 345/173 |
| 8,605,109 | B1 * | 12/2013 | Gulley | G06F 17/18 345/589 |
| 8,660,869 | B2 * | 2/2014 | MacIntyre | G06F 17/30536 705/1.1 |
| 8,682,046 | B2 * | 3/2014 | Kajimoto | G06F 16/51 382/128 |
| 8,723,870 | B1 * | 5/2014 | Libicki | G06T 11/206 345/440 |
| 8,781,742 | B2 * | 7/2014 | Albrecht | G01C 21/367 340/995.14 |
| 8,810,574 | B2 * | 8/2014 | Alsbury | G06T 11/206 345/440 |
| 8,810,595 | B2 * | 8/2014 | Holm-Peterson | G06T 11/20 345/35 |
| 8,823,711 | B2 * | 9/2014 | Mital | G06T 11/206 345/440 |
| 8,856,655 | B2 | 10/2014 | Pendergast et al. | |
| 8,914,740 | B1 * | 12/2014 | Joos | G06F 3/048 345/440 |
| 8,957,920 | B2 * | 2/2015 | Giambalvo | G06F 17/30058 345/619 |
| 9,035,949 | B1 * | 5/2015 | Oberheu | G06T 11/206 345/440 |
| 9,081,474 | B2 * | 7/2015 | Louch | G06F 3/0481 |
| 9,158,766 | B2 * | 10/2015 | Blyumen | G06F 17/30 |
| 9,183,650 | B2 * | 11/2015 | Ruble | G06T 11/206 |
| 9,201,578 | B2 * | 12/2015 | Scott | G06F 3/04845 |
| 9,202,297 | B1 * | 12/2015 | Winters | G06T 11/206 |
| 9,226,672 | B2 * | 1/2016 | Taylor | A61B 5/02007 |
| 9,230,351 | B2 * | 1/2016 | Dodgen | G06T 11/206 |
| 9,239,670 | B2 | 1/2016 | Dewan | |
| 9,256,917 | B1 | 2/2016 | Khafizova | |
| 9,275,482 | B1 * | 3/2016 | Dannelongue | G06F 19/708 |
| 9,317,963 | B2 * | 4/2016 | Ruble | G06T 15/10 |
| 9,323,445 | B2 * | 4/2016 | Kritt | G06F 3/0488 |
| 9,342,497 | B1 * | 5/2016 | Waite | G06F 17/246 |
| 9,363,149 | B1 * | 6/2016 | Chauhan | H04L 41/22 |
| 9,424,333 | B1 | 8/2016 | Bisignani et al. | |
| 9,424,670 | B1 * | 8/2016 | Jin | G06T 11/206 |
| 9,443,336 | B2 * | 9/2016 | Benson | G06T 11/60 |
| 9,472,002 | B1 * | 10/2016 | Wong | G06T 11/206 |
| 9,508,167 | B2 * | 11/2016 | Kim | G06T 11/206 |
| 9,513,783 | B1 * | 12/2016 | Vaidya | G06F 9/451 |
| 9,513,792 | B2 | 12/2016 | Koshi et al. | |
| 9,535,565 | B2 * | 1/2017 | Vranjes | G06F 3/0481 |
| 9,552,557 | B2 * | 1/2017 | Ponomarev | G06Q 10/06 |
| 9,563,674 | B2 * | 2/2017 | Hou | G06F 17/30389 |
| 9,600,915 | B2 * | 3/2017 | Winternitz | G06F 8/38 |
| 9,665,259 | B2 * | 5/2017 | Lee | G06F 3/04845 |
| 9,697,627 | B2 * | 7/2017 | Ruble | G06T 11/206 |
| 9,716,741 | B2 * | 7/2017 | Duncker | H04L 67/02 |
| 9,754,394 | B2 * | 9/2017 | Matsuo | G06T 11/206 |
| 9,754,396 | B2 * | 9/2017 | Krajec | G06T 11/206 |
| 9,760,262 | B2 * | 9/2017 | Drucker | G06F 17/245 |
| 9,870,136 | B2 | 1/2018 | Pourshahid | |
| 9,883,250 | B2 | 1/2018 | Chai et al. | |
| 9,952,738 | B1 | 4/2018 | Kumar et al. | |
| 10,049,475 | B2 * | 8/2018 | Ruble | G06F 3/04845 |
| 10,222,935 | B2 | 3/2019 | Vedha | |
| 2002/0191027 | A1 | 12/2002 | Morrow et al. | |
| 2003/0046396 | A1 | 3/2003 | Richter et al. | |
| 2003/0071814 | A1 | 4/2003 | Jou et al. | |
| 2003/0128212 | A1 * | 7/2003 | Pitkow | G06T 11/206 345/440 |
| 2004/0088656 | A1 | 5/2004 | Washio | |
| 2004/0122601 | A1 * | 6/2004 | Shetty | G06T 11/206 702/35 |
| 2004/0174397 | A1 * | 9/2004 | Cereghini | G06Q 30/02 715/855 |
| 2004/0174563 | A1 | 9/2004 | Cassidy et al. | |
| 2004/0243929 | A1 * | 12/2004 | Jones | G06F 16/9577 715/227 |
| 2004/0252136 | A1 * | 12/2004 | Bhatt | G06F 17/30554 345/619 |
| 2006/0010100 | A1 | 1/2006 | McAvoy et al. | |
| 2006/0070013 | A1 * | 3/2006 | Vignet | G06F 17/30893 715/854 |
| 2006/0119619 | A1 | 6/2006 | Fagans et al. | |
| 2006/0284852 | A1 | 12/2006 | Hofmeister et al. | |
| 2007/0013697 | A1 | 1/2007 | Gilboa | |
| 2007/0024909 | A1 | 2/2007 | Hanechak | |
| 2007/0101255 | A1 * | 5/2007 | Garg | G06F 17/246 715/209 |
| 2007/0126736 | A1 * | 6/2007 | Tolle | G06Q 10/10 345/440 |
| 2007/0208992 | A1 * | 9/2007 | Koren | G06Q 10/10 715/212 |
| 2008/0036767 | A1 * | 2/2008 | Janzen | G06Q 10/10 345/440 |
| 2008/0062175 | A1 * | 3/2008 | Arya | G06T 11/206 345/440 |

(56) References Cited

U.S. PATENT DOCUMENTS

| | | | |
|---|---|---|---|
| 2008/0178117 A1* | 7/2008 | Gelman | G06F 3/0481 715/808 |
| 2008/0192056 A1* | 8/2008 | Robertson | G06T 11/206 345/440 |
| 2008/0209354 A1 | 8/2008 | Stanek et al. | |
| 2009/0009517 A1* | 1/2009 | Palmer | G06T 11/206 345/440 |
| 2009/0096812 A1* | 4/2009 | Boixel | G06Q 10/00 345/646 |
| 2009/0109236 A1* | 4/2009 | Xu | G06L 11/001 345/589 |
| 2009/0199128 A1* | 8/2009 | Matthews | G06F 3/0481 715/799 |
| 2009/0327954 A1 | 12/2009 | Danton et al. | |
| 2010/0005411 A1* | 1/2010 | Duncker | G06F 17/30873 715/769 |
| 2010/0017812 A1* | 1/2010 | Nigam | G06F 8/20 719/328 |
| 2010/0050114 A1 | 2/2010 | Braun et al. | |
| 2010/0077328 A1 | 3/2010 | Berg et al. | |
| 2010/0114752 A1 | 5/2010 | Downs et al. | |
| 2010/0149073 A1* | 6/2010 | Chaum | G02B 27/0093 345/8 |
| 2010/0162152 A1* | 6/2010 | Allyn | G06F 3/0481 715/767 |
| 2010/0194754 A1* | 8/2010 | Alsbury | G06F 3/017 345/440 |
| 2010/0194778 A1* | 8/2010 | Robertson | G06T 11/206 345/619 |
| 2010/0214300 A1* | 8/2010 | Alsbury | G06T 11/206 345/440.2 |
| 2010/0231595 A1* | 9/2010 | Dang | G06F 17/30554 345/440 |
| 2010/0231606 A1 | 9/2010 | Nelson et al. | |
| 2010/0251151 A1* | 9/2010 | Alsbury | G06F 1/1626 715/765 |
| 2011/0041087 A1* | 2/2011 | Leveille | G06T 11/206 715/765 |
| 2011/0050702 A1* | 3/2011 | Heimendinger | G06T 11/206 345/440 |
| 2011/0060998 A1 | 3/2011 | Schwartz et al. | |
| 2011/0066971 A1* | 3/2011 | Forutanpour | G06F 9/451 715/788 |
| 2011/0074786 A1* | 3/2011 | Aggarwal | G06T 11/206 345/440 |
| 2011/0115814 A1* | 5/2011 | Heimendinger | G06F 3/04883 345/619 |
| 2011/0129164 A1* | 6/2011 | Lin | G06T 3/40 382/254 |
| 2011/0144970 A1* | 6/2011 | Jiang | G06F 13/105 703/24 |
| 2011/0148914 A1* | 6/2011 | Kim | G06T 11/206 345/619 |
| 2011/0164055 A1* | 7/2011 | McCullough | G06F 3/04845 345/642 |
| 2011/0219321 A1* | 9/2011 | Gonzalez Veron | G06F 3/048 715/764 |
| 2011/0283231 A1* | 11/2011 | Richstein | G06F 3/0488 715/810 |
| 2011/0289397 A1 | 11/2011 | Eastmond et al. | |
| 2011/0302528 A1* | 12/2011 | Starr | G06F 9/451 715/800 |
| 2011/0307529 A1* | 12/2011 | Mukherjee | G06F 16/1727 707/813 |
| 2011/0317891 A1* | 12/2011 | Kajimoto | G06F 16/51 382/128 |
| 2012/0005045 A1 | 1/2012 | Baker | |
| 2012/0180002 A1* | 7/2012 | Campbell | G06F 3/04883 715/863 |
| 2012/0218289 A1* | 8/2012 | Rasmussen | G06T 11/206 345/619 |
| 2012/0227000 A1 | 9/2012 | McCoy et al. | |
| 2012/0272186 A1* | 10/2012 | Kraut | G06F 3/0488 715/810 |
| 2012/0306887 A1* | 12/2012 | Mohammad | G06Q 99/00 345/440.2 |
| 2013/0024795 A1 | 1/2013 | Robotham et al. | |
| 2013/0042201 A1* | 2/2013 | Sandman, Jr. | G06F 9/542 715/781 |
| 2013/0055058 A1* | 2/2013 | Leong | G06F 17/246 715/219 |
| 2013/0055132 A1 | 2/2013 | Foslien | |
| 2013/0076783 A1* | 3/2013 | Goto | G09G 5/006 345/619 |
| 2013/0080444 A1* | 3/2013 | Wakefield | G06F 17/30994 707/748 |
| 2013/0097544 A1* | 4/2013 | Parker | G09B 29/003 715/771 |
| 2013/0127915 A1* | 5/2013 | Gilra | G09G 5/00 345/660 |
| 2013/0152001 A1* | 6/2013 | Lovitt | G06F 3/0482 715/765 |
| 2013/0187948 A1 | 7/2013 | Yoshimoto et al. | |
| 2013/0194274 A1* | 8/2013 | Ishihara | G06T 11/20 345/440 |
| 2013/0232431 A1* | 9/2013 | Hipsher | G06Q 30/02 715/771 |
| 2013/0311920 A1 | 11/2013 | Koo et al. | |
| 2013/0332862 A1 | 12/2013 | Mirra et al. | |
| 2013/0342541 A1* | 12/2013 | Taylor | G06T 11/20 345/440 |
| 2014/0028227 A1 | 1/2014 | Yasuda et al. | |
| 2014/0040009 A1 | 2/2014 | Shi et al. | |
| 2014/0043325 A1* | 2/2014 | Ruble | G06T 15/10 345/419 |
| 2014/0043331 A1 | 2/2014 | Makinen et al. | |
| 2014/0055459 A1* | 2/2014 | Hiramatsu | G06T 11/206 345/440 |
| 2014/0132609 A1* | 5/2014 | Garg | G06T 11/206 345/440 |
| 2014/0143724 A1* | 5/2014 | Picard | G06T 11/206 715/828 |
| 2014/0146394 A1* | 5/2014 | Tout | G09B 9/307 359/630 |
| 2014/0149931 A1 | 5/2014 | Miki | |
| 2014/0160131 A1* | 6/2014 | Azizi | G06T 11/206 345/440 |
| 2014/0176555 A1* | 6/2014 | Kuo | G06T 11/206 345/440 |
| 2014/0210827 A1* | 7/2014 | Alsbury | G06T 11/206 345/440.2 |
| 2014/0247268 A1* | 9/2014 | Drucker | G06T 13/80 345/440.2 |
| 2014/0266990 A1* | 9/2014 | Makino | G02B 27/017 345/8 |
| 2014/0282124 A1* | 9/2014 | Grealish | G06F 3/048 715/762 |
| 2014/0282145 A1* | 9/2014 | Dewan | G06F 3/04842 715/765 |
| 2014/0282276 A1* | 9/2014 | Drucker | G06F 17/245 715/863 |
| 2014/0300603 A1* | 10/2014 | Greenfield | G06T 11/206 345/440 |
| 2014/0310646 A1* | 10/2014 | Vranjes | G06F 9/451 715/788 |
| 2014/0351722 A1* | 11/2014 | Frederickson | G06F 3/0481 715/761 |
| 2014/0354650 A1 | 12/2014 | Singh et al. | |
| 2014/0362087 A1* | 12/2014 | Irani | G06T 17/05 345/440 |
| 2014/0362108 A1* | 12/2014 | Aguera-Arcas | G06T 17/005 345/629 |
| 2015/0015504 A1* | 1/2015 | Lee | G06F 3/04845 345/173 |
| 2015/0029213 A1* | 1/2015 | Benson | G06T 11/206 345/625 |
| 2015/0067568 A1* | 3/2015 | Lee | G06F 3/04842 715/771 |

(56) References Cited

U.S. PATENT DOCUMENTS

| | | | |
|---|---|---|---|
| 2015/0135113 A1 | 5/2015 | Sekharan | |
| 2015/0170384 A1* | 6/2015 | Matsumoto | G06T 11/206 345/629 |
| 2015/0178963 A1* | 6/2015 | Lu | G06T 11/206 345/440 |
| 2015/0207833 A1* | 7/2015 | Tsubotani | G06F 3/04842 715/753 |
| 2015/0237085 A1 | 8/2015 | Duncker et al. | |
| 2015/0254369 A1* | 9/2015 | Hou | G06F 3/0486 707/798 |
| 2015/0261392 A1* | 9/2015 | Son | G06F 3/0482 715/779 |
| 2015/0261728 A1 | 9/2015 | Davis | |
| 2015/0262396 A1 | 9/2015 | Devarajan et al. | |
| 2015/0277708 A1* | 10/2015 | Rodrig | G06F 3/04842 715/777 |
| 2015/0302051 A1* | 10/2015 | Baumgartner | G06F 17/30554 707/754 |
| 2016/0055232 A1* | 2/2016 | Yang | G06T 11/206 707/740 |
| 2016/0078127 A1* | 3/2016 | Bhat | G09B 7/00 704/9 |
| 2016/0092084 A1 | 3/2016 | Dyar et al. | |
| 2016/0098187 A1* | 4/2016 | Kim | G06F 3/04817 715/768 |
| 2016/0103581 A1 | 4/2016 | Kim et al. | |
| 2016/0124587 A1* | 5/2016 | Covington | G06F 3/0482 345/440 |
| 2016/0124605 A1* | 5/2016 | Covington | G06F 3/04812 345/173 |
| 2016/0124612 A1* | 5/2016 | Covington | G06F 3/04842 345/173 |
| 2016/0124635 A1* | 5/2016 | Covington | G06F 3/04886 345/440 |
| 2016/0132225 A1 | 5/2016 | Lee et al. | |
| 2016/0162165 A1* | 6/2016 | Lingappa | G06T 11/206 715/771 |
| 2016/0180555 A1* | 6/2016 | Matsuo | G06T 11/206 345/440 |
| 2016/0180556 A1* | 6/2016 | Deng | G06T 11/206 345/440 |
| 2016/0188185 A1* | 6/2016 | Bous | G06T 11/206 715/202 |
| 2016/0231900 A1* | 8/2016 | Meaney | G06F 3/04842 |
| 2016/0267056 A1* | 9/2016 | Hertzog | G06F 3/04842 |
| 2016/0275144 A1 | 9/2016 | Herman et al. | |
| 2016/0307344 A1* | 10/2016 | Monnier | G06T 11/206 |
| 2016/0307355 A1* | 10/2016 | Breedvelt-Schouten | G06T 13/80 |
| 2016/0337205 A1* | 11/2016 | Nagahama | H04L 41/22 |
| 2016/0350950 A1* | 12/2016 | Ritchie | G06T 11/206 |
| 2016/0364770 A1 | 12/2016 | Denton et al. | |
| 2017/0004638 A1* | 1/2017 | Csenteri | G06T 11/206 |
| 2017/0010792 A1* | 1/2017 | Stewart | G06F 3/04845 |
| 2017/0054613 A1 | 2/2017 | Keahey et al. | |
| 2017/0069118 A1* | 3/2017 | Stewart | G06T 11/206 |
| 2017/0076471 A1* | 3/2017 | Prophete | G06T 11/206 |
| 2017/0091967 A1* | 3/2017 | Roepke | G06T 11/206 |
| 2017/0091968 A1* | 3/2017 | George | G06T 11/206 |
| 2017/0102866 A1 | 4/2017 | Calvillo et al. | |
| 2017/0109907 A1* | 4/2017 | Hamedani | G06T 11/206 |
| 2017/0123639 A1* | 5/2017 | Kennedy | G06F 3/04845 |
| 2017/0124048 A1* | 5/2017 | Campbell | G06F 17/212 |
| 2017/0124740 A1* | 5/2017 | Campbell | G06F 3/04847 |
| 2017/0124761 A1* | 5/2017 | Michel | G06T 17/20 |
| 2017/0126772 A1* | 5/2017 | Campbell | G06F 17/212 |
| 2017/0132582 A1* | 5/2017 | Sakairi | G06Q 10/30 |
| 2017/0139894 A1* | 5/2017 | Welch | G06F 17/246 |
| 2017/0140395 A1* | 5/2017 | Doi | G06O 30/0201 |
| 2017/0161926 A1* | 6/2017 | Shetty | G06T 11/206 |
| 2017/0169592 A1* | 6/2017 | Ruble | G06F 3/04845 |
| 2017/0178368 A1 | 6/2017 | Noon et al. | |
| 2017/0200294 A1* | 7/2017 | Hirano | G01J 1/4257 |
| 2017/0206684 A1* | 7/2017 | Duncker | G06T 11/206 |
| 2017/0212944 A1 | 7/2017 | Hellman et al. | |
| 2017/0221242 A1* | 8/2017 | Street | G06T 5/50 |
| 2017/0236312 A1* | 8/2017 | Ruble | G06F 9/4443 345/440 |
| 2017/0236314 A1* | 8/2017 | Ruble | G06T 3/40 345/592 |
| 2017/0255686 A1* | 9/2017 | Ross | G06F 17/30572 |
| 2017/0262165 A9 | 9/2017 | Calvillo et al. | |
| 2017/0351713 A1* | 12/2017 | Chamberlain | G06K 9/6202 |
| 2017/0358112 A1 | 12/2017 | Peters et al. | |
| 2017/0364237 A1 | 12/2017 | Zheng et al. | |
| 2018/0025035 A1 | 1/2018 | Xia et al. | |
| 2018/0025073 A1 | 1/2018 | Singh et al. | |
| 2018/0025517 A1 | 1/2018 | Grealish et al. | |
| 2018/0052597 A1 | 2/2018 | Stokes et al. | |
| 2018/0067625 A1 | 3/2018 | Kim et al. | |
| 2018/0128636 A1 | 5/2018 | Zhou | |
| 2018/0165844 A1* | 6/2018 | Kirichenko | G06T 11/206 |
| 2018/0268577 A1 | 9/2018 | Neves | |
| 2018/0335937 A1 | 11/2018 | Hauenstein et al. | |
| 2018/0341839 A1* | 11/2018 | Malak | G06K 9/726 |
| 2018/0350116 A1* | 12/2018 | Ruble | G06F 3/04845 |
| 2019/0012342 A1* | 1/2019 | Cohn | G06F 11/30 |
| 2019/0065014 A1 | 2/2019 | Richter et al. | |

OTHER PUBLICATIONS

Kunz, Gion., "Chartist.js, an Open-Source Library for Responsive Charts", Published on: Dec. 16, 2014 Available at: http://www.smashingmagazine.com/2014/12/chartist-js-open-source-library-responsive-charts/.

"Making charts and maps responsive", Published on: Jan. 23, 2015 Available at: http://www.amcharts.com/tutorials/making-charts-responsive/.

Amico, Chris., "DavaViz for Everyone: Responsive Maps with D3", Published on: Aug. 26, 2013 Available at: http://eyeseast.github.io/visible-data/2013/08/26/responsive-d3/.

"Introducing responsive charts and maps", Published on: Jan. 26, 2015 Available at: http://www.amcharts.com/blog/responsive-charts/.

Sikkema, Albert., "Responsive charts using CSS media queries", Published on: Dec. 4, 2012 Available at: http://forum.highcharts.com/highcharts-usage/responsive-charts-using-css-media-queries-t22558/.

"Smart Charts", Retrieved on: Oct. 7, 2015 Available at: https://codeontime.com/learn/touch-ui/charts/smart-charts.

"Zing chart", Retrieved on: Oct. 7, 2015 Available at: http://www.zingchart.com/features/responsive-charts/.

Rigdon, Sarah., "Print Vs. Web, Static Vs. Interactive", Retrieved on: Oct. 7, 2015 Available at: https://infoactive.co/data-design/ch16.html.

"Responsive Web Design concepts", Published on: Apr. 15, 2015 Available at: http://docs.telerik.com/kendo-ui/using-kendo-in-responsive-web-pages.

Acampora, Jon., "How to Make Your Excel Dashboards Resize for Different Screen Sizes", Published on: Jul. 20, 2015 Available at: http://www.excelcampus.com/vba/resize-dashboards-for-screen-sizes/.

Potschien, Denis., "Chartist.js Creates Responsive, Animated Charts with SVG", Published on: Jun. 12, 2015 Available at: http://www.noupe.com/design/chartist-js-creates-responsive-animated-charts-with-svg-88363.html.

International Search Report and the Written Opinion issuec in PCT Application No. PCT/US2016/065033 dated Mar. 1, 2017.

Christopher, "Some simple tricks for creating responsive charts with D3", Published Nov. 23, 2015. Retrieved from <<http://blog/webkid/io/responsive-chart-usability-d3/#Prevent_overlapping_of x-axis_labels>>.

"Responsive Graph Presentation", IP.com Journal, IP.com Inc., West Henrietta, NY, US, Dec. 27, 2013.

Pengfei Xu et al: "GACA", Human Factors in computing Systems, ACM, 2 Penn Plaza, Suite 701 New York NY 10121-0701 USA, Apr. 18, 2015, pp. 2787-2795.

(56) References Cited

OTHER PUBLICATIONS

Cameron McCormack et al: "Authoring Adaptive Diagrams", Document Engineering, ACM, 2 Penn Plaza, Suite 701 New York NY 10121-0701 USA, Sep. 16, 2008, pp. 154-163.

Kim Marriott et al: "Fast and efficient client-side adaptivity for SVG", Proceedings of the 11th International Conference on World Wide Web, ACM, Honolulu, Hawaii, USA, May 7, 2002, pp. 496-507.

Yingcai Wu et al: "ViSizer: A Visualization Resizing Framework", IEEE Transactions on Visualization and Computer Graphics, IEEE Service Center, Los Alamitors, CA, US, vol. 19, No. 2, Feb. 2013, pp. 278-290.

International Search Report and Written Opinion issued in Published PCT Application No. PCTUS2017-016667 dated Jun. 22, 2016.

International Search Report and the Written Opinion issued in PCT Patent Application No. PCT/US2017/016751 dated Jun. 29, 2017.

Office Action dated Feb. 21, 2017 cited in U.S. Appl. No. 14/967,911.

Office Action dated Aug. 24, 2017 cited in U.S. Appl. No. 14/967,911.

2nd Written Opinion issued in Published PCT Application No. PCT/US2016/065033, dated Oct. 24, 2017.

"Advisory Action Issued in U.S. Appl. No. 15/042,957", dated Aug. 6, 2018, 6 Pages.

"Final Office Action Issued in U.S. Appl. No. 15/042,957", dated May 11, 2018, 33 Pages.

"Non Final Office Action Issued in U.S. Appl. No. 15/042,957", dated Oct. 2, 2017, 27 Pages.

"International Preliminary Report on Patentability Issued in PCT Application No. PCT/US2016/065033", dated Mar. 5, 2018, 8 Pages.

"Introducing Amazon QuickSight—YouTube", Retrieved from: https://www.youtube.com/watch?v=Tj0gW4XI6vU, Retrieved on: Feb. 25, 2019, 2 Pages.

"Non Final Office Action Issued in U.S. Appl. No. 15/042,957", dated Apr. 18, 2019, 38 Pages.

\* cited by examiner

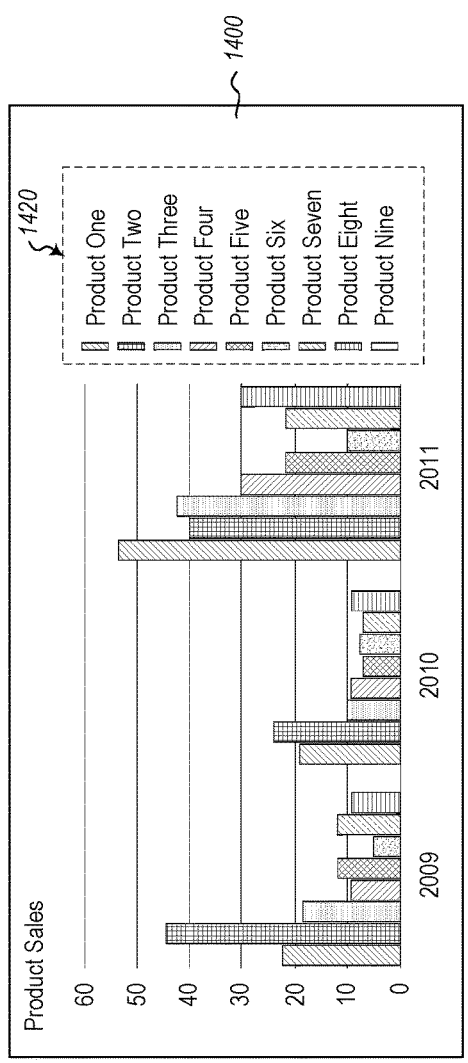
Figure 14
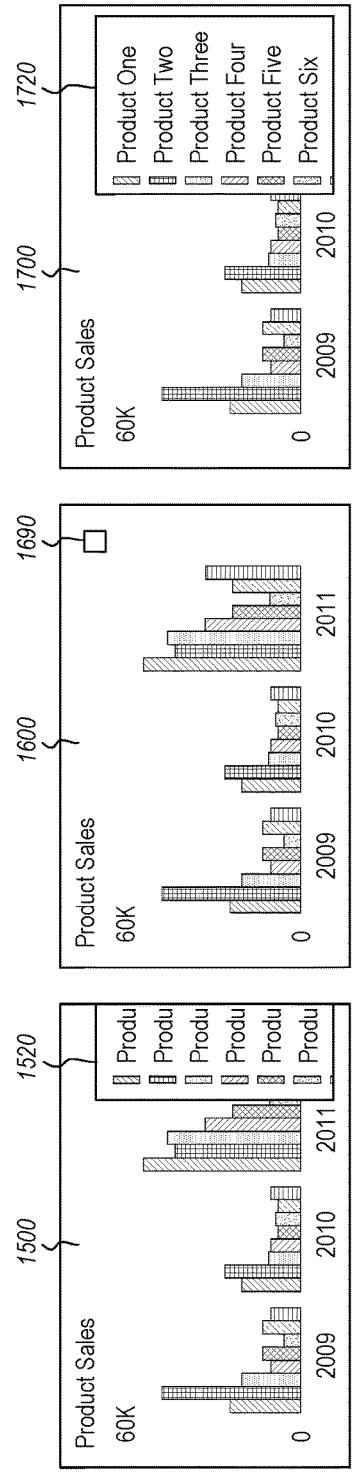
Figure 15
Figure 16
Figure 17

INTERACTIVE CONTROLS THAT ARE COLLAPSIBLE AND EXPANDABLE AND SEQUENCES FOR CHART VISUALIZATION OPTIMIZATIONS

There are many types of chart visualizations that can be used to represent data, including graphs, plots, maps, tables and other types of charts. It is common for these chart visualizations to include labels, legends, titles, gridlines, and other textual and graphical elements to help identify, describe, quantify and/or otherwise reflect the relative relationships between the underlying data.

To improve the readability and visual appearance of a chart visualization, the chart elements are appropriately sized and arranged for display on the intended target displays. For instance, a chart that is rendered on a desktop monitor will often be configured with larger fonts and, sometimes, with more chart elements than when the same chart is configured for presentation on smaller handheld devices.

Some software applications, including Microsoft's Excel®, are specifically configured to adjust the display attributes of a chart in response to the resizing of the chart. For instance, when a chart is initially created in Excel®, the default size of the chart can be 600 pixels wide by 360 pixels tall (e.g., 5"×3"). The elements of the chart (e.g., legend, title, etc.) are laid out within the chart based on this default size for preferred readability and aesthetics. When the chart is subsequently reduced in size, due to user input and/or in response to displaying the chart on a different device, certain chart elements can be removed from the chart and/or scaled within the chart.

When chart elements are removed from the chart, including labels, values, legends and/or other elements, it can become difficult to use or interpret the underlying data of the chart. To access the content that was removed, the user may have to resize the chart and/or access the data through menus or from the underlying data sources. However, this can be cumbersome and inconvenient.

Accordingly, there is an ongoing need for improved systems and methods for managing chart visualizations, particularly during optimizations of the chart visualizations.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

As described herein, various methods, systems and storage devices are provided for performing chart visualization optimizations in response to detecting triggering events.

By way of example, a computing system performs chart visualization optimizations for a chart visualization that includes a plurality of modifiable chart elements. The computing system accesses the chart visualization and detects input that is operable to initiate at least one optimization of the chart visualization that affects visualization of the chart elements. Thereafter, the computing system progressively performs the at least one optimization in a predetermined sequence that includes at least removing one or more of the different chart elements and displaying the chart visualization as an optimized chart visualization consisting of a single displayed value that replaces the one or more chart elements that were removed from the chart visualization.

Various methods, systems and storage devices are also provided for creating and utilizing interactive controls that are dynamically created in response to one or more chart elements being removed from a chart visualization during optimization of the chart visualization and that are selectably operable for accessing the removed one or more chart elements. These interactive controls are also dynamically collapsible and expandable in response to detected user input.

In at least some embodiments, a computing system implements a method for creating and/or utilizing interactive controls for chart visualizations that are accessed by the computing system. The chart visualizations includes a plurality of different chart elements that have display attributes that are modifiable during optimizations of the chart visualizations. The computing system identifies one or more chart elements to be removed from the chart visualizations responsive to one or more optimizations associated with triggering events affecting visibility of the chart visualizations. Thereafter, the computing system removes the one or more chart elements from the chart visualizations and dynamically creates one or more interactive controls for providing access to the removed chart elements and/or other data items. These interactive controls are collapsible and expandable in response to user input. In some embodiments, the interactive control includes a selectable link and the computing system, upon detecting input directed at the interactive control, responsively displays the removed chart elements and/or other data items.

Additional features and advantages will be set forth in the description, which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered limiting in scope, embodiments will be described and explained with additional specificity and detail through the use of the accompanying drawings in which:

FIGS. 14-22 illustrate examples of chart visualizations having different chart elements corresponding to the interactive control referenced in the flowchart of FIG. 13.

DETAILED DESCRIPTION

Figure 1:
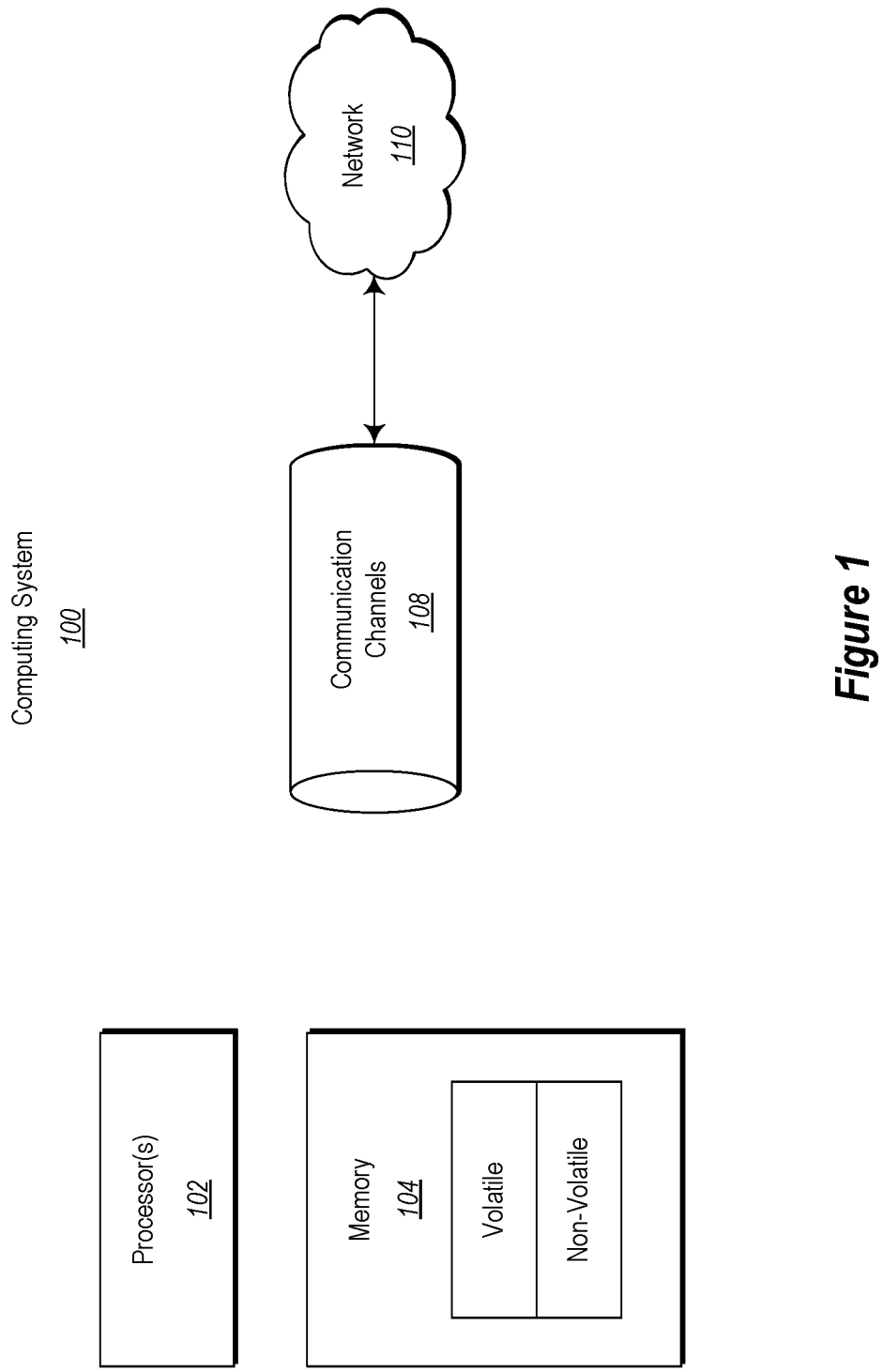
FIG. 1 illustrates an embodiment of a computing system which is usable to implement aspects of the disclosed embodiments.

Aspects of the disclosed embodiments generally relate to embodiments for optimizing chart visualizations and, even more particularly, to methods, systems and storage devices that perform specific sequences and actions while optimizing chart visualizations and/or that utilize a dynamic and interactive controls for accessing chart elements.

Some of the disclosed embodiments include a computing system executing stored computer-executable instructions with one or more processors of the computing system in order to perform a method of creating and/or utilizing an interactive control that is dynamically provided in response to one or more chart elements being removed from a chart visualization during optimization of the chart visualization and that is operable for responsively and dynamically accessing the removed one or more chart elements in response to user input directed at the interactive control.

Some of the disclosed embodiments also include a computing system executing stored computer-executable instructions with one or more processors of the computing system in order to perform a method for performing chart visualization optimizations in response to detecting a triggering event according to a particular sequence and/or by performing at least a particular optimization that includes removing one or more of the different chart elements and displaying the chart visualization as an optimized chart visualization consisting of only a single displayed value that replaces the one or more chart elements that were removed from the chart visualization.

The disclosed embodiments are usable to improve the overall user experience with charting applications, such as during the optimization of chart visualizations that remove chart elements in an intuitive manner, and for accessing removed chart elements and corresponding data by utilizing interactive controls and/or by being presented summary values that represent one or more removed data elements.

In at least this regard, there are various technical effects and benefits that can be achieved by implementing aspects of the disclosed embodiments. By way of example, the disclosed embodiments can be used to provide enhanced user controls for accessing chart elements to aid in the readability and/or functionality of the optimized charts.

The technical effects related to the disclosed embodiments also include improved user convenience and efficiency gains through a reduction in a quantity of steps that are required to access the chart elements, such as, for example, through cumbersome menus. The technical effects also include efficiency gains for computing systems through a reduction in processing overhead associated with receiving and processing multiple manual user inputs that would otherwise be required for accessing removed chart elements and/or to interpret the underlying data of the removed chart elements. The technical effects related to the present disclosure further include the presentation of consolidated data that intelligently represent omitted chart elements in a new and useful way, so that a chart visualization is capable of summarizing at least some data as a single value when all other chart elements have been removed from the chart visualization.

Various methods, computing systems and storage devices will now be described with reference to the disclosed embodiments for performing chart visualization optimizations and for utilizing interactive controls.

Computing Environment

In this description and in the claims, the term "computing system" is defined broadly as including any device or system (or combination thereof) that includes at least one physical and tangible processor, and a physical and tangible memory capable of having thereon computer-executable instructions that may be executed by the processor.

As illustrated in FIG. 1, in its most basic configuration, the computing system 100 includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

As used herein, the term "executable module" or "executable component" can refer to software objects, routines, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 104 of the computing system 100.

Figure 3:
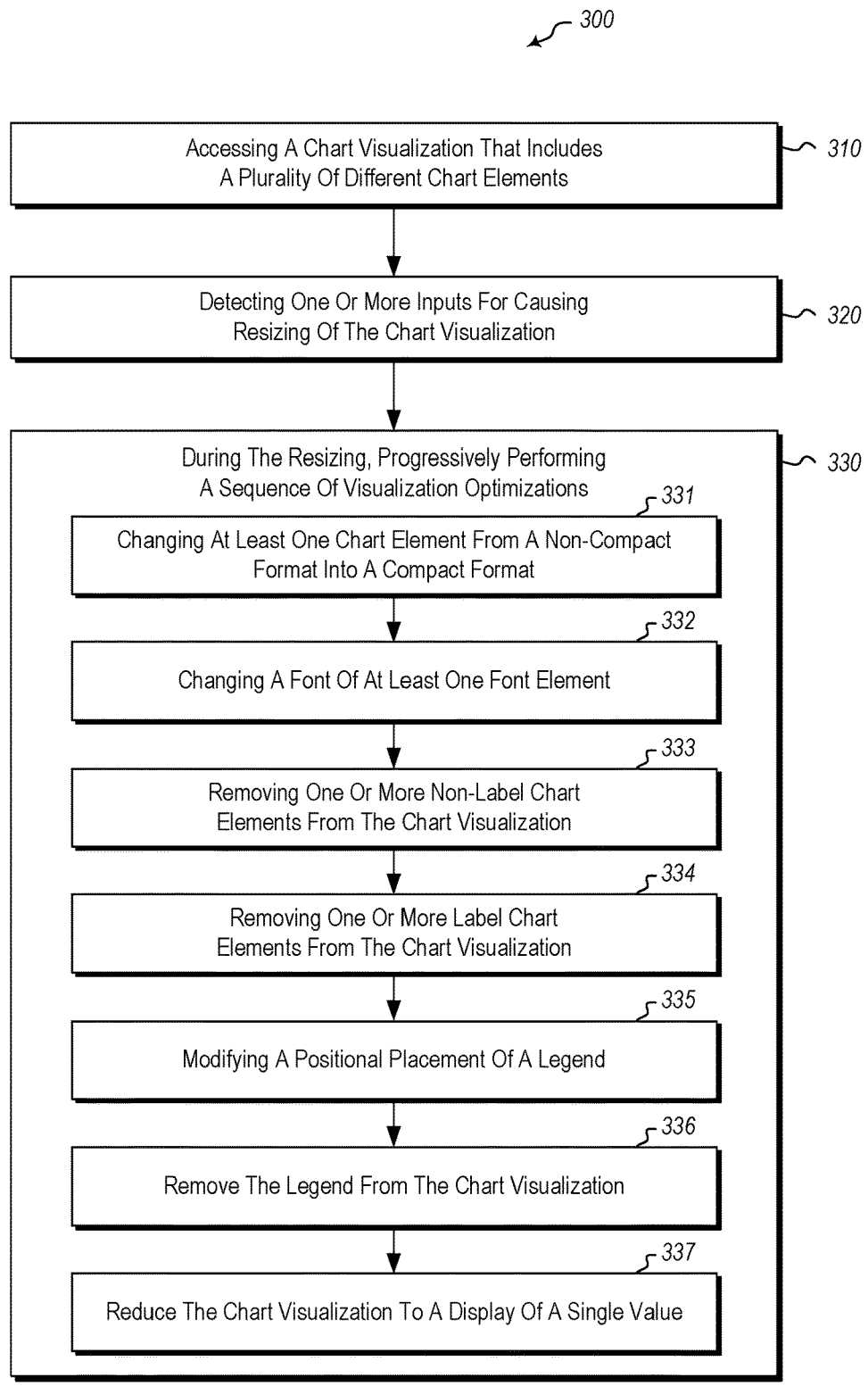
FIG. 3 illustrates a flowchart of at least one method for performing chart visualization optimizations.

The computer-executable instructions may be used to implement and/or instantiate all of the functionality disclosed herein, including, but not limited to the functionality that is disclosed in reference to the flow diagram of FIG. 3.

Computing system 100 may also contain communication channels 108 that allow the computing system 100 to communicate with other message processors over, for example, network 110.

Embodiments described herein may comprise or utilize special-purpose or general-purpose computer system components that include computer hardware, such as, for example, one or more processors and system memory. The system memory may be included within the overall memory 104. The system memory may also be referred to as "main memory," and includes memory locations that are addressable by the at least one processing unit 102 over a memory bus in which case the address location is asserted on the memory bus itself. System memory has been traditionally volatile, but the principles described herein also apply in circumstances in which the system memory is partially, or even fully, non-volatile.

Embodiments within the scope of this disclosure also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical hardware storage devices that store computer-executable instructions and/or data structures. Physical hardware storage devices include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the principles described herein may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Alternatively, or in addition, the functionality described herein can be performed, at least in part, by one or more hardware logic components. For example, and without limitation, illustrative types of hardware logic components that can be used include: Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

When the referenced acts of the disclosed methods are implemented in software, the one or more processors 102 of the computing system 100 perform the acts and direct the operation of the computing system 100 in response to having executed the stored computer-executable instructions defined by the software. Various input and output devices, not illustrated, can be used by the computing system to receive user input and to display output in accordance with the computer-executable instructions.

Various methods for implementing the disclosed embodiments, such as with computing system 100, will now be described, along with a description of chart visualizations and corresponding chart visualization optimizations.

Resizing of Chart Visualizations

Figure 2:
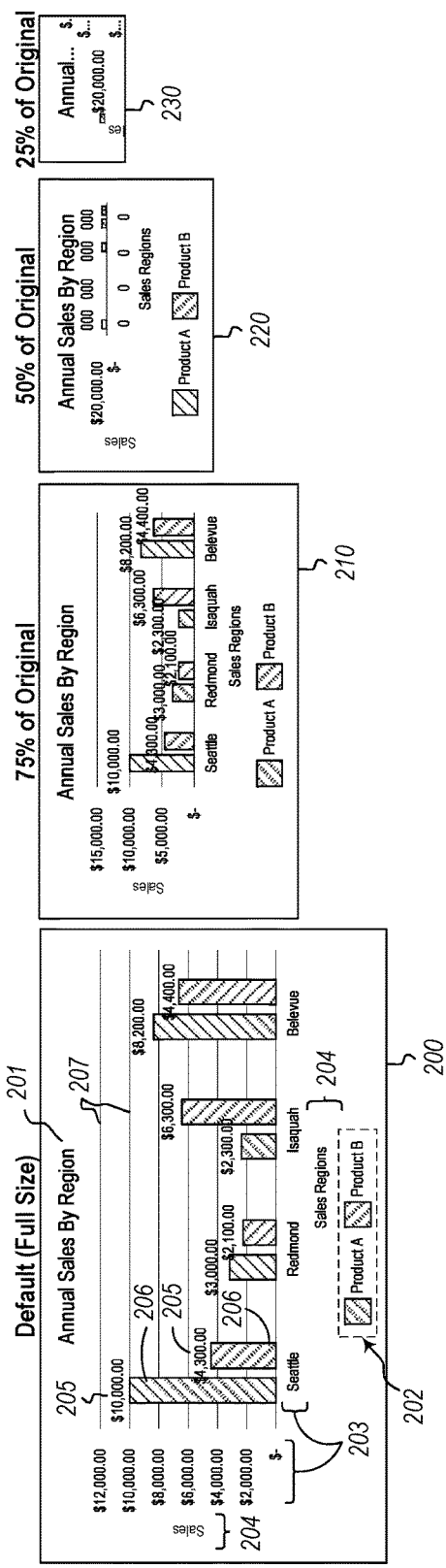
FIG. 2 illustrates a set of chart visualizations having different sizes and configurations.

FIG. 2 illustrates a plurality of chart visualizations (200, 210, 220 and 230) that correspond to underlying data. In the present example, the underlying data comprises sales data and the chart visualizations reflect annual sales by regions.

The first chart visualization 200 is rendered at a default size. In this default size, various chart elements are presented, including a title 201, a legend 202, data labels 203, axis labels 204, in-chart labels 205, graphical data objects 205, and gridlines 207.

Chart visualization 210 is based on the same underlying data as chart visualization 200, but fewer chart elements are presented in the second visualization. Furthermore, the font size and position of some of the chart elements have also been changed. This is done, according to some implementations, to improve readability of the chart visualization 210 at the reduced size which, in this case, is at a 25% reduction of the original default size, such that it is now rendered at 75% of the original size. Similarly, a reduction of the original chart visualization 200 by 50% is shown by chart visualization 220, which includes even fewer chart elements. Finally, chart visualization 230 reflects a 75% size reduction of the original size, such that it is now rendered at 25% of the original size, and which includes yet even fewer chart elements. In some instances, the chart elements are replaced by new chart elements to facilitate the readability of chart (e.g., adding labels $15,000.00 to chart visualization 210 and by adding label $20,000.00 to chart visualizations 220 and 230).

Despite the foregoing modifications, whether performed manually or automatically, it may still be difficult, sometimes, to read all of the text that is presented within the labels, depending on the size of the text, the amount of overlap and the variance in contrast between the overlapping elements and the other display attributes of the chart elements (as shown). The aesthetic appeal of the chart may also be affected in a negative way, depending on when the foregoing changes are made or not made, as well as how they are made. Furthermore, at some point, the chart cannot continue to be reduced in size without removing or resizing all of the chart elements in such a way that the underlying data is unreadable and unusable. In some instances, the user may also wish to access the removed chart elements. But, existing systems do not provide an intuitive way to understand and/or access the removed chart elements including particular labels, values, images, legends or other elements that the user deems critical to the interpretation, usability, appeal or other functionality of the chart.

Chart Visualization Optimizations and Sequencing

To help address at least some of the foregoing problems, embodiments of this disclosure may be utilized to improve the manner in which chart optimizations are performed, by performing the chart optimizations in a particular sequence and/or by including at least one optimization that includes summarizing and presenting summary data and/or replacement data for removed chart elements directly within the chart visualizations as a single summarizing and/or replacement value.

In some embodiments, a modification to a chart (sometimes referred to herein as a chart optimization) may occur automatically and/or manually in response to detecting a triggering event (e.g., in response to a resizing of the chart, an overlap of chart elements, an obstruction to one or more chart elements, and so forth). The resulting chart optimizations or chart modifications include any combination of repositioning chart elements, temporarily removing or permanently removing chart elements, replacing chart elements and/or changing display attributes of the chart elements (e.g., size, font, transparency, contrast, coloring, etc.).

The flowchart 300 of FIG. 3, for instance, illustrates a method that starts with a computing system accessing a chart visualization that includes a plurality of different chart elements (act 310). Thereafter, input is detected for causing a resizing or other modification to the chart visualization (act 320). Finally, a sequence of visualization optimizations is performed during the resizing or other chart modification/optimization (act 330). These referenced acts will be described in more detail below. But first, a more detailed description of the chart visualization and chart elements will be provided.

The accessed chart visualization comprises any chart type, including, but not limited to, one or more bar charts, bubble charts, pie charts, line charts, column charts, area charts, scatter plots, combo charts, doughnut charts, surface charts, radar charts, histogram charts, pareto charts, waterfall charts, box & whisker charts, treemap charts, sunburst charts, funnel charts, or other charts, plots or graphs, maps, tables or other chart visualizations that reflect relationships between data aggregations or any other types of underlying data.

The chart elements referred to by this disclosure include one or more textual elements and/or graphical elements. The textual elements include any combination of number, character and/or symbol. Graphical elements include any combination of one or more axis lines, grid lines, tick marks, lines, bars, wedges, circles, squares, dots, or any other shapes, icons, pictures, animations or any other graphical elements.

Each of the different chart elements have one or more corresponding display attributes, including one or more coloring, contrast, brightness, size, font type or other font attribute, thickness, shading, orientation, tapering, transparency, position or other display attribute. These display attributes include any combination of default attributes or user defined attributes that are stored in and accessible through data structures stored in the system memory. The display attributes also include any combination of one or more value, label, graphical object and/or other rendered component associated with the corresponding chart element(s).

The display attributes for particular chart elements are, according to some embodiments, modifiable during optimizations of the chart visualizations. In some embodiments, the chart visualization also includes general chart display attributes similar to the display attributes of individual chart elements, including attributes associated with scaling, size, color, font, visibility, etc., all of which are also modifiable.

As indicated above, the computing system will (at some point) detect input that is operable to cause a modification to the chart visualization. This modification will affect visualization of one or more of the chart elements (act 306) through an optimization of the chart visualization, this optimization includes modifying one or more of the display attributes for the chart elements. The triggering input that is detected by the computing system includes any input that is sufficient to trigger an optimization or other modification to the chart visualization.

Triggering Events for Modifying Chart Visualizations

Some specific examples of inputs comprising triggering events for optimizations that affect the chart visualization, such as a resizing of the chart visualization (act 320) and/or that correspond to a reduction in visibility to one or more chart elements, will now be provided.

In one instance, a triggering event includes determining that the chart visualization is to be rendered on a display device having particular size constraints that require resizing of the chart visualization from an initial size. This determination/instruction can be, for instance, an input that causes resizing (e.g., zooming in or out) within a chart viewport and/or the resizing of a viewport relative to an interface/browser layout viewport in which the chart viewport is presented.

In some instances, the triggering events include detecting an overlap that is about to occur, prior to actually rendering the visualization by a graphics card of the computing system and/or the presentation of the chart visualization on a system display screen.

In some embodiments, the triggering events include detecting an actual overlap that has occurred for a chart visualization that is rendered to a user on a display device with other display objects, by analyzing a resized chart visualization simultaneously to or after it is being processed for display, with an analysis of other potentially displayed objects.

In some embodiments, the triggering events include detecting that the overlap is occurring within the chart by one or more predetermined chart elements. These predetermined chart elements can include any combination of one or more textual or graphical elements (e.g., one or more legend, title, label, value, a largest element, a smallest element, multiple textual chart elements, multiple graphical chart elements, chart elements that are within a predetermined visibility threshold based on contrasts or transparencies, elements having particular coloring, elements having particular shading, elements having particular sizes, fonts, shapes, or other display attributes).

In some instances, the triggering events include detecting that the overlap exceeds a predetermined threshold amount, such as a predetermined percentage of one of the elements (e.g., X % of total area of the element(s)) is overlapped and/or a predetermined magnitude of the element(s) is overlapped (e.g., a predetermined number of pixels, characters, quantity of elements, or other magnitude of detectable overlap).

In some instances, the triggering events also include the changing of a display attribute without actually increasing or otherwise changing an amount of overlap that already existed. For instance, two elements may already be overlapping and their transparencies, relative contrasts, coloring, or other display attributes may be within a predetermined tolerance of visibility (as defined by one or more stored tolerance values), such that a triggering event does not initially exist. However, a change to one of the display attributes of one or more of the chart elements may be sufficient to cause a triggering event when the change results in the transparencies, relative contrasts, coloring, or other display attributes to fall outside of a predetermined tolerance of visibility for overlapping elements.

In some embodiments, the trigger event includes a combination of two or more of the foregoing triggering events, for two, three or any other quantity of overlapping chart elements.

The process for detecting the triggering events, includes, according to some embodiments, referencing tables and other data structures that specify the relative or fixed placements of the different chart elements and/or their corresponding display attributes. In some embodiments, the processes for detecting the triggering events includes, additionally, or alternatively, intercepting or otherwise accessing data sent to or received from the graphics card on the computing system or application interface(s) (e.g., spreadsheet table) processing the chart visualizations.

In some embodiments, the settings for controlling what qualifies as adequate triggering events are user defined, through menus that enable the receipt of user input that is operable to define the user settings.

In some embodiments, the settings for controlling what qualifies as adequate triggering events are based on chart type, element type, display type and/or chart visualization size, such that the settings differ for different types of charts, chart elements and/or display types.

Sequencing of Visualization Optimizations

Some specific examples of different optimizations that are performed responsive to the disclosed triggering events and the sequences for performing those optimizations will now be described with reference to acts 331, 332, 333, 334, 335, 336 and 337 of FIG. 3 and the chart visualizations of FIGS. 4-12.

The illustrated optimizations of the flow diagram 300 of FIG. 3 include changing at least one chart element from a non-compact format into a compact format (act 331), changing a font of at least one font element (e.g., a text or character) element (act 332), removing one or more non-label chart element from the chart visualization (act 333), removing one or more label chart element from the chart visualization (act 334), modifying a positional placement of the legend (act 335), removing the legend from the chart visualization (act 336) and/or reducing the chart visualization to a display of a single value (act 337).

It will be appreciated that the disclosed optimizations performed in response to the triggering event(s) include any combination of one or more of the recited acts (331, 332, 333, 334, 335, 336 and 337). Furthermore, in some instances, the optimizations are performed only in an ordering that corresponds to the ordering shown in FIG. 3, including any combination of two or more of the recited acts (331, 332, 333, 334, 335, 336 and 337). For instance, the act of removing the legend (act 336) will only occur, in some instances, after first moving the legend to a different location within the chart visualization (act 335). Likewise, the act of removing a label chart element (act 334) will only occur after first removing at least one non-label chart element (act 333), and changing a font of an element (act 332) will only occur after first changing that element from a non-compact form to a compact form (act 331). This specified ordering will, in some instances, create efficiencies during processing of the chart optimizations (e.g., having to change the font of fewer characters will require less computer processing) and also to improve user experiences (e.g., by reducing chart elements in an intuitive manner) and to facilitate interpretation and usability of the chart visualizations during and subsequent to the optimizations (e.g., by preserving relevant information as long as possible, including a key summarizing value for the chart visualization when all other elements are removed).

In other embodiments, only some of the illustrated optimizations are performed in the sequencing that is presently illustrated, while some acts are performed in different sequencing. For instance, as shown in one of the examples below, a legend can be repositioned (in one embodiment) prior to removing one or more chart elements. However, even in this embodiment, at least some of the sequenced optimizations will still be performed in the sequencing order that is illustrated by the flow diagram 300 of FIG. 3.

Specific examples of performing the recited optimizations (e.g., acts 331, 332, 333, 334, 335, 336 and 337) will now be provided in reference to the chart visualizations of FIGS. 4-12.

Figure 4:
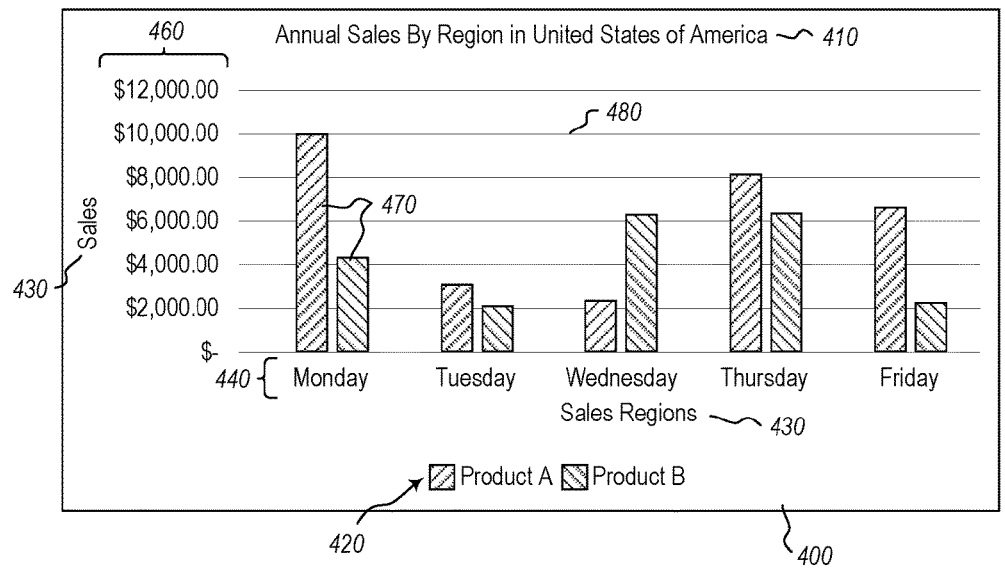
FIGS. 4-12 illustrate examples of charts having different sizes and configurations that correspond to different aspects of the disclosed embodiments for performing chart visualization optimizations.
Figure 5:
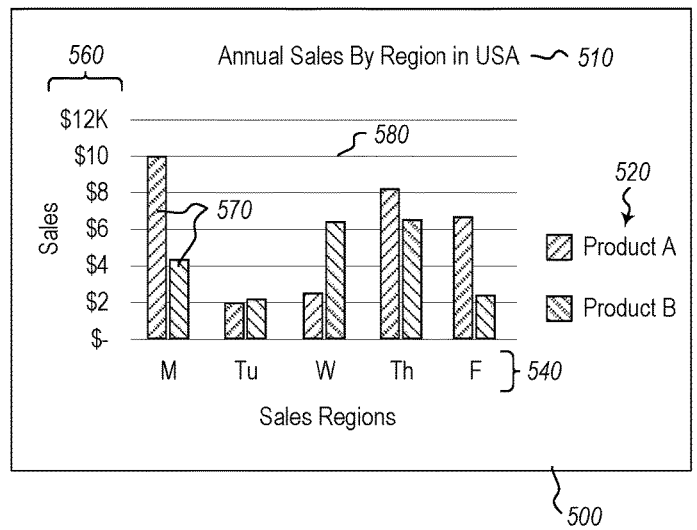
Figure 6:
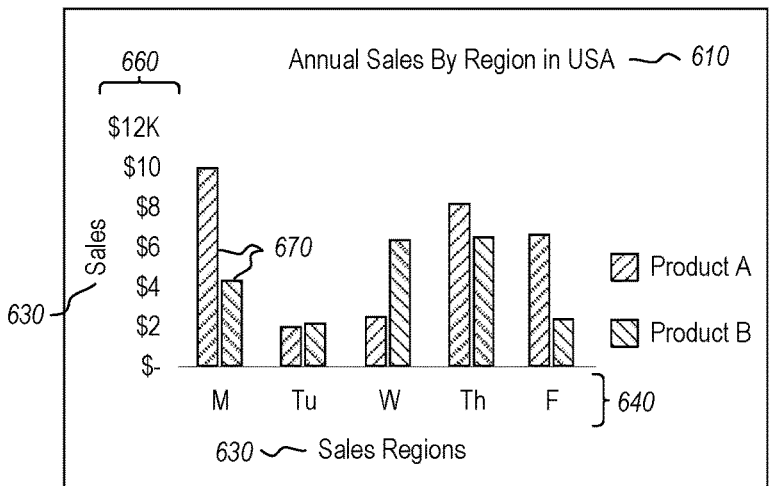

As shown in FIG. 4, a chart visualization 400 is presented with various chart elements, including a title 410, a legend 420, axis category labels 430 (i.e., 'Sales' and 'Sales Regions'), tick mark labels 440 and 460 and graphical elements 470 (only some of which are referenced) and that visually reflect how the underlying data is related to both the different labeled categories (e.g., sales regions by day) and scaled sales values. The chart visualization 400 also includes gridlines 480 that help reflect relative magnitudes of the different underlying data intersections that are presently illustrated by the graphical elements 470.

Chart visualization 400 is subsequently resized, responsive to user input or an application process that includes one or more of the triggering events described above. For instance, in response to the triggered chart resizing (e.g., before, during or after the actual rendering of the resized visualization), the computing system detects an overlap condition or another triggering event for triggering the optimizing of the chart visualization in such a way as to affect rendering of one or more of the chart elements.

The computing system then responds to the detected input (act 320) by performing one or more sequenced optimizations (act 330), such as by performing the act of changing an element from a non-compact format into a compact format (act 331). This optimization is reflected by resized chart visualization 500 of FIG. 5. In particular, some of the elements have been abbreviated, such as the title 510 (e.g., using the term 'USA' instead of 'United States of America') and the numerical presentation of the tick mark labels 540 and 560. The optimizations that resulted in chart visualization 500 also included moving the legend 520.

The modifications performed during these optimization sequences are selectively limited and based (according to some embodiments) on which elements have been tagged and which display attributes for the tagged elements are identified (implicitly or explicitly) to be preserved during the modifications, based on the stored default display attribute settings, for example. Accordingly, while the flowchart 300 of FIG. 3 does not include specific acts for tagging chart elements or referencing stored display attribute settings, the embodiments of this disclosure include embodiments for receiving tagging input directed to chart elements and for storing/identifying display attributes to be preserved for those tagged chart elements.

By way of further example, some disclosed embodiments include an act of detecting tagging input that implicitly or explicitly identifies at least one display attribute for a tagged chart element to be preserved during optimization of the chart visualization, such as a value, label, graphical object and/or any of the other component of a chart element to be preserved, as well as the other display attributes to be preserved for the tagged chart element (e.g., font size, coloring, transparency, contrast, position, existence, full version vs. abbreviated version, etc.).

In some instances, a set of display attributes are maintained as a default set of display attributes to be preserved for a tagged chart element whenever that chart element is tagged. In some instances, the stored set of default display attributes includes a value or label for a chart element to be preserved. Alternatively, or additionally, the default set of display attributes includes a font, a size, an attribute, a visibility, an abbreviation, a replacement value and/or a position of an element or any other display attribute or combination of display attributes for one or more corresponding chart element.

In some instances, the default set of display attributes is maintained in a table or other data structure that is stored by and/or accessible to and readable by the computing system. The computing system references this data structure during chart optimizations to identify which chart elements and/or display attributes to modify or not, based on whether the corresponding chart elements have been tagged.

When a chart element is a label or value, the different default sets of display attributes may include specific abbreviations that are determined to be suitable alternatives that preserve an intended meaning of the original chart elements. For instance, the label "United States" for a tagged element may be preserved by using the abbreviation "U.S." and "US," when specified as such by the stored default set of display attributes.

In some instances, the display attributes are user modifiable, based on user input provided to one or more input fields of a table or other stored data structure that are operable to define and/or modify the default set of stored display attributes. In some instances, these input fields are displayed as and/or are modifiable through menus or other interface objects that are rendered in response to a user selecting a chart element from the chart and/or through directory menus accessible through an application interface control ribbon (not presently shown).

According to one embodiment, resizing of the chart visualization 500 triggers yet another optimization (e.g., by causing an overlap of the legend 520 with the gridlines 580, by causing labels to overlap with other elements, or by another triggering event) that results in the system automatically removing one or more of the non-label chart elements (e.g., gridlines 580 have been removed) (act 333).

Optimizations for creating new chart visualization 600 also includes, according to some embodiments, the changing of a font corresponding to the labels and other chart elements that were previously reformatted into a compact formation (e.g., title 610 and tick mark labels 640 and 660). In the present embodiment, the changes to the font (e.g., size, color, type, etc.) is not presently reflected. However, any change to the font is adequate to perform act 332, which is performed subsequent to act 331. The change in the font, to a different type and/or size is beneficial for helping with the readability and/or visibility of the corresponding chart elements.

Figure 7:
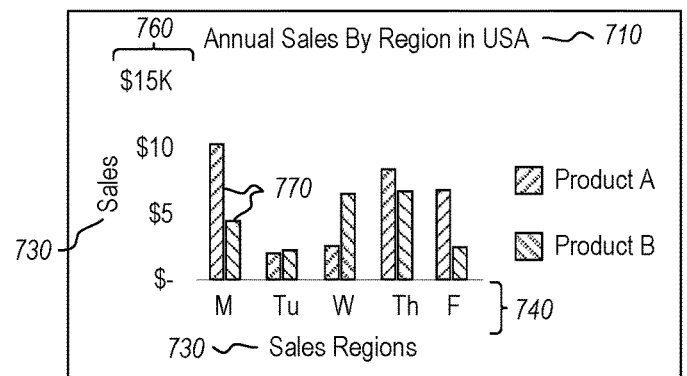

A further modification and optimization of the chart is reflected in FIG. 7. For instance, chart visualization 700 omits at least some of the label chart elements (e.g., at least some of the tick mark labels 640 and 660 of visualization 600) (act 334), subsequent to removing at least one of the non-label elements (e.g., the gridlines 580 of FIG. 5) (act 333).

Figure 8:
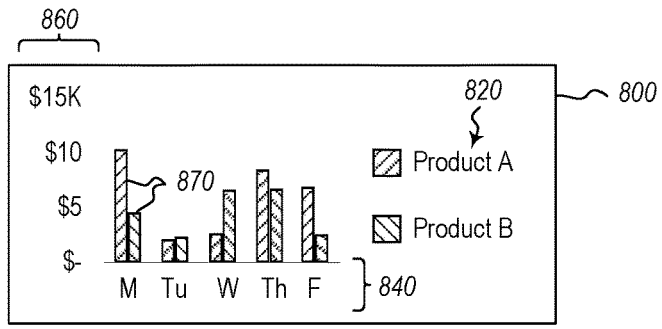

In a subsequent optimization, triggered by chart visualization 700 being reduced in shape and size, the system generates visualization 800 of FIG. 8. In this optimized visualization 800, label elements are removed from the chart visualization 800 (act 334), including the title 710 and the axis category labels 730 of visualization 700. The legend 820 and the tick mark labels 840 and 860 remain, however, along with the chart elements 870 because they were either tagged and/or because the system determined they had a higher priority value than the removed elements based at least in part on the stored default display attributes.

Figure 9:
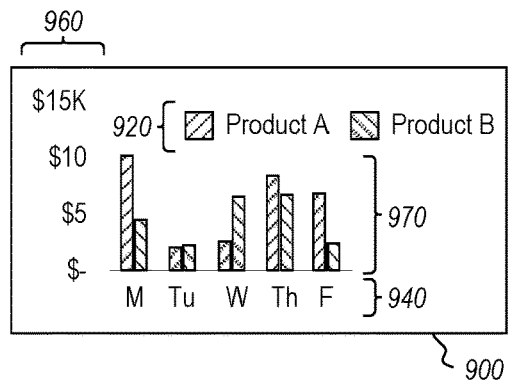
Figure 10:
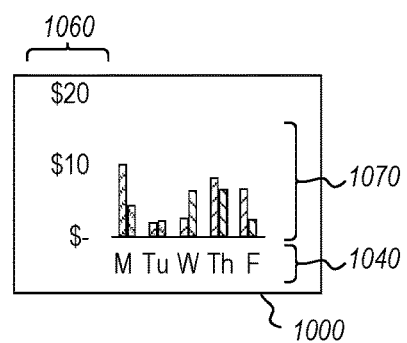

When chart visualization 800 is further reduced in shape and size, another triggering event is detected, which results in another optimization and the creation of visualization 900 of FIG. 9. In this optimized visualization 900, the legend 920 is repositioned and reconfigured (act 335). In a previous optimization (see FIGS. 4-5) the legend was also moved. Accordingly, this indicates how act 335 and the other recited acts can be performed multiple times in multiple different optimizations.

In the present example, the legend 920 is preserved, along with chart elements 970 and labels 940 and 960, because one or more of these elements was identified as important and/or was tagged and the system preserved the default set of display attributes identified for those tagged elements. For instance, the system reconfigured and moved the legend 920 rather than completely removing the legend 920, because the identified display attributes to be preserved for the legend 920 referenced size and presence. But, the configuration and location attributes were not identified by the stored settings as also needing to be preserved.

In some instances, the chart elements and their display attributes will only be preserved, until certain conditions are met (e.g., until the chart is reduced to a certain size). For instance, a further reduction of chart visualization 900 will cause an optimization that results in the optimized visualization 1000 of FIG. 10. In this optimization, the legend 920 has been removed (act 336). Some elements remain, however, inasmuch as they may have been previously tagged for preservation, or based on these elements being high priority elements, such as labels 1040 and 1060 and chart elements 1070.

Figure 11:
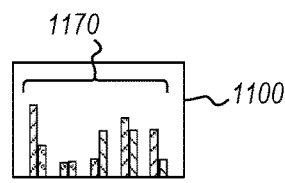
Figure 12:
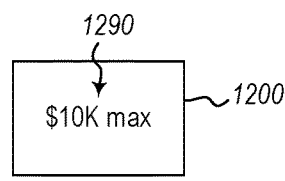

The optimizations applied to the chart visualizations will then continue, based on one or more triggering events associated with resizing the chart visualizations, by removing additional chart elements, resulting in visualization 1100 of FIG. 11.

Continued or selective resizing of the chart visualization will also trigger at least one optimization for reducing the chart visualization and all of the corresponding chart elements to a single displayed value (act 337). This is shown, for example, by the visualization 1200 of FIG. 12, which consists of only a single element 1170 comprising a particular value. This particular value corresponds to one or more chart elements that were previously tagged and/or to a value specified by the default display attributes associated with the chart elements or their underlying data (e.g., a max value, an average value, a cumulative value, a differential value, or another value associated with underlying data of the chart visualization).

In some embodiments, the remaining value is specified by a user during a tagging process. In some embodiments, the computing system automatically calculates or identifies this value based on a default setting in response to the chart being reduced to a predetermined size (e.g., by being reduced to a predetermined number of pixels, by being reduced by a predetermined percentage, until a predetermined number of chart elements have been determined to be unreadable and/or removed, in response to the chart being reduced by a predetermined magnitude, etc.). The remaining value is calculated subsequent to detecting the triggering event (e.g., reducing the chart size) and/or prior to the triggering event occurring. This value is stored in the default display attribute data structure or another structure that is accessed by the computing system during the optimization(s).

In some embodiments, the optimization(s) performed by the computing system will result in the creation of an optimized chart visualization that omits all chart elements comprising labels or values other than the single displayed value. This value includes, in some instances, a previously display chart value that was previously rendered within the chart visualization. In some embodiments, the value is a new value that was not previously rendered in the chart visualization, but which nonetheless corresponds to the underlying data of the chart visualization.

In some embodiments, the optimized chart visualization omits all other values from the chart visualization except for the lone remaining value which is displayed with one or more graphical and non-textual chart elements that represent or otherwise correspond to the value.

Dynamic and Interactive Controls

As indicated above, some embodiments of this disclosure correspond to the creation and use of interactive controls that are dynamically presented/created in response to one or more chart elements being removed from a chart visualization during optimization of the chart visualization and that are operable for accessing the removed one or more chart elements.

Figure 13:
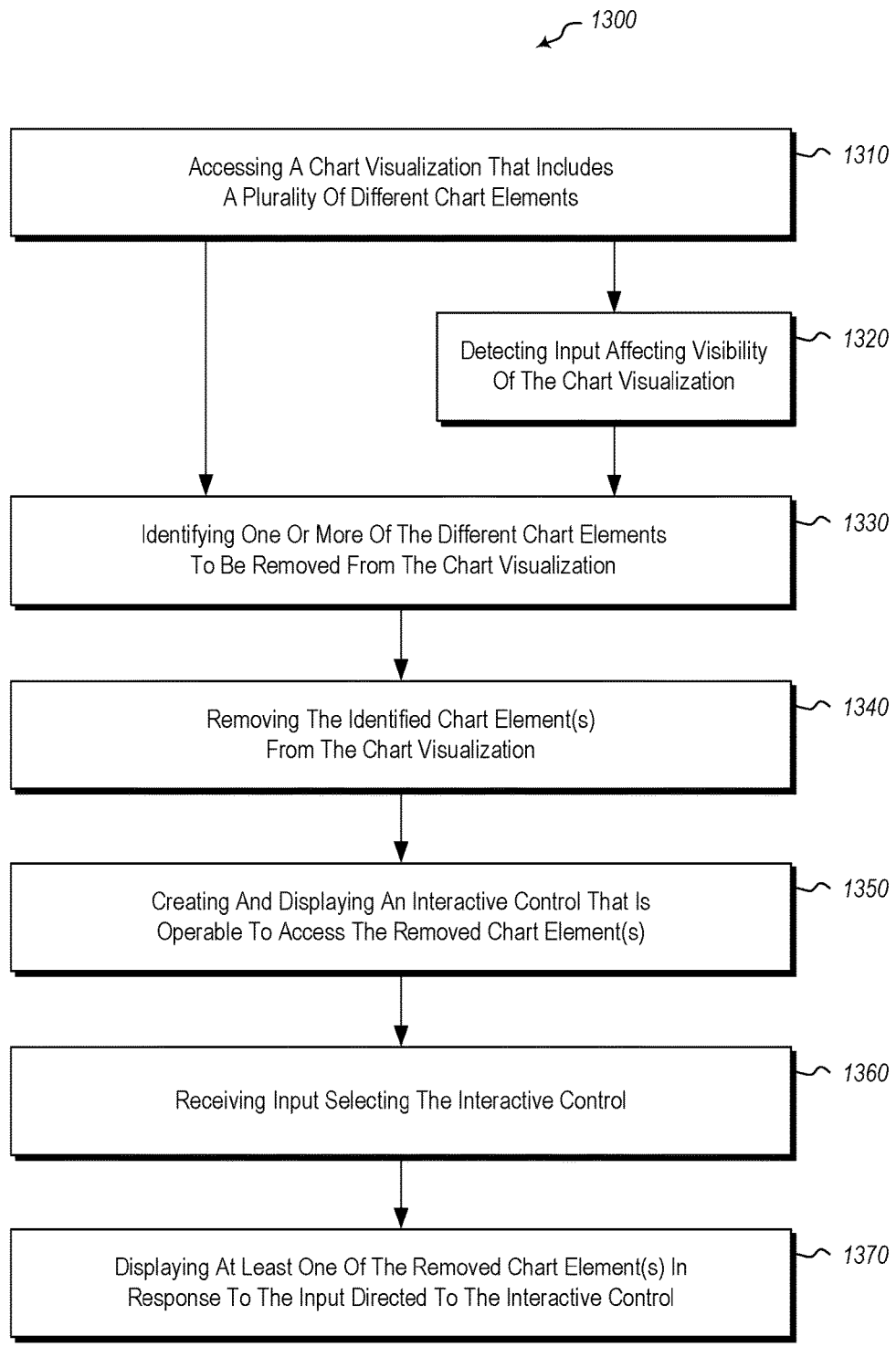
FIG. 13 illustrates a flowchart of at least one method for creating, providing and/or otherwise utilizing a dynamic and interactive control for accessing chart elements, including chart elements that are removed during visualization optimizations.

The flowchart 1300 of FIG. 13 illustrates various acts associated with the disclosed methods for creating and using interactive controls. These acts include: accessing a chart visualization that includes a plurality of different chart elements (act 1310), wherein each of the different chart elements have display attributes that are modifiable during optimization of the chart visualization; detecting input affecting visibility of the chart visualization (act 1320); identifying one or more chart elements to be removed from the chart visualization responsive to an optimization that is triggered by a triggering event that affects visibility of the chart visualization (act 1330); removing the one or more chart elements from the chart visualization (act 1340); dynamically creating an interactive control that is operable, in response to detected user input directed to the interactive control, to access the removed one or more chart elements (act 1350); receiving and/or detecting the input directed at the interactive control (act 1360); and/or displaying the removed chart elements in response to the input directed at the interactive control (act 1370).

In some embodiments, the interactive control comprises a selectable link which is operable, when selected, to cause a display of the one or more chart elements that were previously removed from the chart. This selectable link is displayed, in some instances, directly within the chart visualization upon removing the one or more of the identified chart elements from the chart, as described in more detail below with regard to FIGS. 16, 19 and 20. In some alternative or additional embodiments, the computing system turns one or more of the remaining chart elements into the selectable link, as described in more detail below with regard to FIG. 21.

Attention is now directed to FIGS. 14-17, which illustrate chart visualizations 1400, 1500, 1600 and 1700 corresponding to sales data for various products reflected in legends 1420, 1520 and 1720.

In these examples, a modification is made to the chart visualization 1400 that causes at least one of the chart elements to be obstructed, as illustrated by the obstruction to legend 1520 in chart visualization 1500, as well as some of the graphic elements in the visualization 1500. This causes the system to detect a triggering event for optimizing the visualization 1500 by removing the legend from the visualization (as reflected in visualization 1600). However, a user may want to view the removed legend without having to navigate cumbersome menus. The present disclosure provides a solution for this problem. In one embodiment, for example, the system generates, creates or otherwise obtains and displays an interactive control that is selectable to cause the interactive control to be expanded and to thereby provide access the removed chart elements that are presented in the expanded interactive control (i.e., the legend in this example). Later, the interactive control is collapsed, in response to user input, thereby hiding or otherwise removing the chart elements again.

In the present example, the interactive control includes a selectable link that is rendered as a displayed object 1690. This link is operable, when selected, to expand the interactive control and/or to render a separate interactive control interface that renders a display of the legend, as shown by the rendering of legend 1720 in FIG. 17. Alternatively, or additionally, one or more of the graphical elements (e.g., the displayed bars or other chart elements) are converted into a selectable link that is operable, when selected, to render one or more of the removed chart elements within the expanded/new interactive control interface. The selection of the link for expanding the interactive control includes any input that is capable of selecting the link, such as one or more mouse click, one or more touch on a touch sensitive display, one or more key command, one or more mouse prompt hovering over the selectable link and/or other input directed to the selectable link. Similar input can also be received to collapse the interactive control interface, such one or more mouse click, one or more touch on a touch sensitive display, one or more key command, removing a mouse prompt from hovering over the selectable link and/or other input that is directed away from the interactive control.

It is noted that the display of the legend or other chart element, dynamically in response to the selection of the interactive control link, will sometimes overlap with other displayed chart elements (see FIG. 17). This behavior will not, according to some embodiments, trigger an optimization of the chart visualization. In other embodiments, however, this will trigger an optimization that will cause a removal, repositioning or other modification to displayed chart elements. For instance, the embodiment of FIG. 22 reflects a removal of a legend 2120 (FIG. 21) that was obstructed during the presentation of summary data 2225 that was previously removed (due to another optimization) and subsequently displayed (as a result of a selection of an interactive control link 2291).

Figure 18:
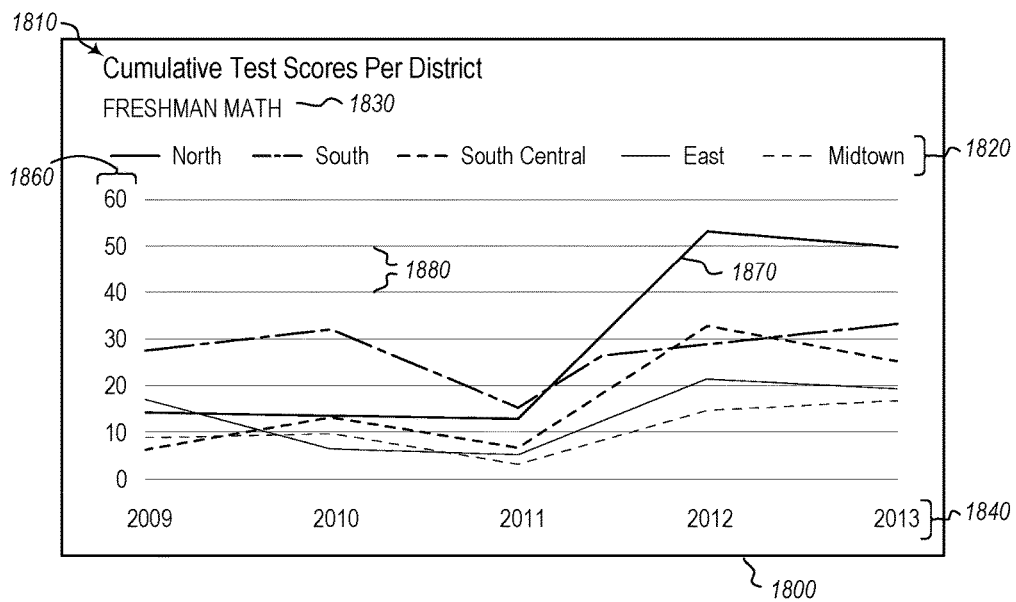
Figure 19:
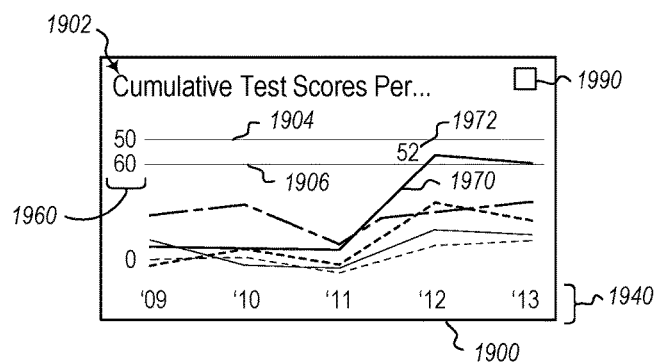

Attention is now directed to FIGS. 18-19, which reflect an illustration of rendering a link 1990 for the interactive control that is operable, when selected, for expanding the interactive control and/or causing a display of a new interactive control frame that displays or otherwise provides access to the removed chart elements. For example, the visualizations 1800 and 1900 reflect cumulative test scores for school districts, as reflected by titles 1810 and 1902.

In this example, the optimization to visualization 1800 causes a removal of a legend 1820 and a sub-title 1830. Many of the gridlines 1880 (only some of which are currently referenced) are also removed, along with some or all of the tick mark labels 1860. Other tick mark labels 1840 are represented by abbreviated tick mark labels 1940.

In this embodiment, a selection of the link 1990 (which was created and displayed upon removing and/or modifying chart elements) will cause a display of at least some of the removed chart elements and/or a display of new chart elements. For example, in this embodiment, a selection of link 1990 will cause a display of gridlines 1904 and 1906, which were previously removed, along with a display of tick mark labels 1960, which were also previously removed.

In some embodiments, the graphic element 1970 is also turned into a selectable link which, when selected, causes a display of the newly presented value 52 (which was not previously rendered in the chart), along with one or more of the gridlines 1904 and 1906 or tick mark labels 1960. As illustrated with this example, multiple different links are provided, in some instances, to provide different access points to the removed chart elements and/or other relevant data (some of which may be new data that was not previously displayed within the chart visualization).

Figure 20:
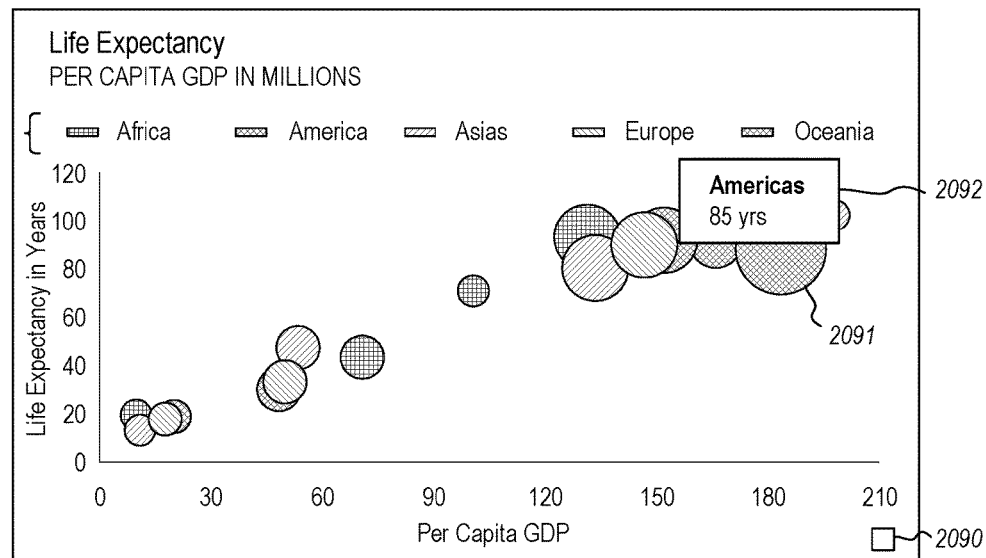
Figure 21:
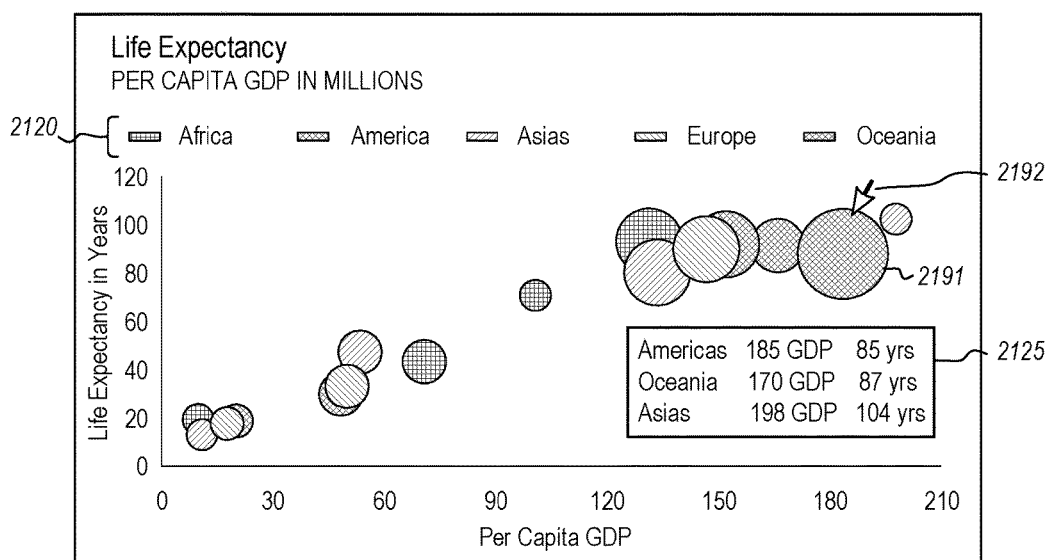
Figure 22:
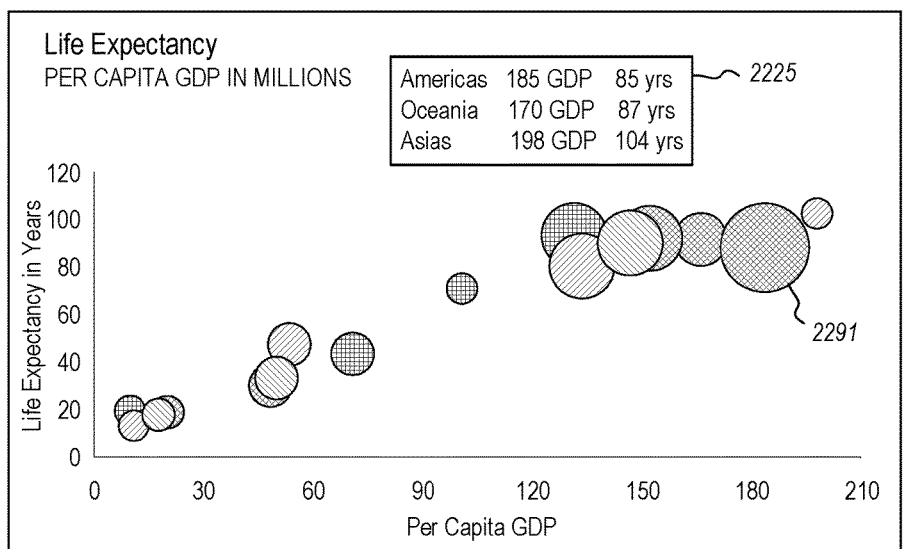

FIGS. 20-22 also reflect additional examples for rendering interactive controls that are operable to access removed chart elements and other data corresponding to the chart elements. In FIG. 20, for example, a link 2090 is provided for an interactive control that is expanded to display or otherwise provide access to data object 2092 in response to a selection of the link 2090. In one embodiment, element 2091 is also modified into a selectable link for the interactive control. This generation of the selectable link by modifying element 2091 occurs during and/or subsequent to a removal of the chart elements, such as during a previous optimization of the chart. The removed chart elements (not shown) correspond to the data that is now shown in data object 2092.

FIG. 21 represents a related embodiment in which a selection of element 2191 causes a display of summary data within interactive control interface 2125, wherein the summary data comprises chart elements or related data for the chart elements (not shown) which were previously removed from the chart visualization 2100 during an earlier optimization. In this embodiment, element 2191 is modified into a selectable link that is operable, when selected, to display an expanded interactive control interface that renders chart elements that were removed during the optimization(s) of the chart.

In some embodiments, selection of different links to the interactive control will cause the expanding of different interactive control interfaces and the display of different chart elements that were previously removed and/or other related data. For instance, the selection of link 2091 will cause a display of interactive control interface object 2092, in one embodiment, while a selection of link 2090 will cause a display of summary data within interactive control interface 2125.

It will be appreciated, with regard to the foregoing examples, the links to the interactive controls are presentable at different locations and with different configurations within the chart visualization. For instance, link 1990 is presented in a top right corner of visualization 1900. Link 2090, on the other hand, is presented in a bottom right corner of visualization 2000. Element 2191 was also provided as a link within the graphical elements and body of the chart visualization 2100. Accordingly, the interactive controls are configurable for presentation in different locations (e.g., in corners, along edges, within the chart elements, etc.) and with different sizes, shapes and configurations within the chart visualizations to accommodate different needs and preferences.

Additionally, even though the forgoing embodiments show the interactive control interfaces being displayed within the boundaries of the chart visualizations, it will be appreciated that in other embodiments (not presently shown), the interactive control interfaces are displayed outside of the boundaries of the chart visualizations as newly framed objects or display elements.

Settings that specify what data and or chart elements to display within the interactive control interfaces, as well as where and how the interactive control interfaces are displayed, are accessed and/or otherwise identified by the computing system during the optimization(s) and/or in response to detecting input selecting the link(s). In some embodiments, the interactive control settings also identify which data to remove, if any, responsive to a selection of an interactive control link and/or upon rendering data corresponding to a selected interactive control link, such as described above with regard to FIG. 22. For instance, in FIG. 22, a selection of link 2291 will trigger a display of interactive control interface 2225 and a removal of a legend (not shown in FIG. 22), such as legend 2120 from FIG. 21.

The interactive control settings also specify the different conditions and inputs that are operable to trigger the expanding and collapsing of the interactive controls, as well as the size constraints and other display attributes of the interactive control interfaces (e.g., levels of transparency, contrast, font sizing, coloring, positioning, etc.).

These interactive control settings are stored in the default display attribute data structure or another data structure. The interactive control settings are also user modifiable, as described above with regard to the default display attribute settings, through user interfaces and menus and are applicable to different predetermined conditions (e.g., type of link being selected, type or quantity of chart elements that have been removed, chart size and corresponding available space for displaying the interactive control interfaces, etc.).

During implementation of the disclosed embodiments, the computing system accesses and applies the stored interactive control settings in response to correspondingly appropriate conditions and inputs detected by the computing system.

It will be appreciated from the foregoing that many aspects of the disclosed embodiments are usable to facilitate the optimizations of chart visualization and to provide user controls for enabling a user to selectively access chart elements, including elements that are removed during chart visualization optimizations. While many of the foregoing examples regarding chart optimizations and tagging controls have been described with regard to bar charts, it will be appreciated that the scope of this disclosure relates to optimizations and triggering events for all types of chart visualizations.

Furthermore, although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims. Accordingly, all changes which come within the meaning and range of equivalency of the claims are to be embraced within their scope.

What is claimed is:

1. A computing system configured for creating and utilizing an interactive control that is dynamically created in response to one or more chart elements being removed from a chart visualization during optimization used to resize the chart visualization for a smaller display area while still permitting selective access to the removed one or more chart elements, the computing system comprising:
    one or more processors; and
    one or more hardware storage device having stored computer-executable instructions which are executable by the one or more processors to cause the computing system to perform the following computer-implemented method:
        accessing at a device a chart visualization that includes a plurality of different chart elements, at least some of the different chart elements having display attributes that are modifiable during an optimization used to resize the accessed chart visualization for a smaller display area of the device, and wherein at least some of the display attributes are set as default attributes that are stored in and accessible through data structures stored in system memory;
        in response to an event that requires resizing the accessed chart visualization for the smaller display area, triggering an optimization sequence used to resize the accessed chart visualization for the smaller display area, wherein the optimization sequence comprises:
            triggering a first optimization used to resize and reduce the accessed chart visualization by a first given percentage relative to the accessed chart visualization's original size; and
            successively triggering one or more further optimizations in order to further resize and reduce the accessed chart visualization by at least a second given percentage relative to the accessed chart visualization's original size; and
            wherein chart elements having display attributes that are default attributes are not hidden or modified during the first or any subsequently triggered optimization unless the chart visualization is reduced to a certain threshold size or smaller;
        identifying one or more chart elements that do not have default attributes and which are to be modified or hidden from the accessed chart visualization responsive to each triggered optimization;
        for each triggered optimization, reducing the overall size of the accessed chart visualization by the given percentage for the triggered optimization, relative to the accessed chart visualization's original size, by modifying or hiding the one or more chart elements that do not have default attributes from the accessed chart visualization in accordance with the triggered optimization;
        presenting the reduced accessed chart visualization in an optimized format in which the one or more chart elements that do not have default attributes have been modified or hidden in accordance with the optimization sequence;
        as part of the optimized format, presenting an interactive control that is associated with at least one modified or hidden chart element; and
        in response to detected user input at the interactive control, accessing the at least one modified or hidden chart element.

2. The computing system of claim 1, wherein the interactive control comprises a selectable link which is operable, when selected, to cause a display of the one or more modified or hidden chart elements.

3. The computing system of claim 2, wherein the method performed comprises displaying the selectable link within the optimized format for the accessed chart visualization.

4. The computing system of claim 2, wherein one of the displayed chart elements of the optimized format comprises the selectable link.

5. The computing system of claim 4, wherein the method performed comprises displaying one or more new chart elements in response to a selection of the selectable link.

6. The computing system of claim 1, wherein the one or more chart elements includes a chart legend.

7. The computing system of claim 1, wherein the one or more chart elements includes a label.

8. The computing system of claim 1, wherein the one or more chart elements includes at least one non-textual graphical chart element.

9. A computer-implemented method for creating and utilizing an interactive control that is dynamically created in response to one or more chart elements being hidden from a chart visualization during optimization used to resize the chart visualization for a smaller display area while still permitting access to the hidden one or more chart elements, the method being implemented by at least one processor and computer-executable instructions that are executable by the at least one processor when performing the method, which comprises:
    accessing at a device a chart visualization that includes a plurality of different chart elements, at least some of the different chart elements having display attributes that are modifiable during an optimization used to resize the accessed chart visualization for a smaller display area on the device, and wherein at least some of the display attributes are set as default attributes that are stored in and accessible through data structures stored in system memory;
    in response to an event that requires resizing the accessed chart visualization for the smaller display area, triggering an optimization sequence used to resize the accessed chart visualization for the smaller display area, wherein the optimization sequence comprises:
triggering a first optimization used to resize and reduce the accessed chart visualization by a first given percentage relative to the accessed chart visualization's original size; and
successively triggering one or more further optimizations in order to further resize and reduce the accessed chart visualization by at least a second given percentage relative to the accessed chart visualization's original size;
identifying one or more chart elements to be modified or hidden from the accessed chart visualization responsive to the triggered optimization; and
wherein chart elements having display attributes that are default attributes are not hidden or modified during the first or any subsequently triggered optimization unless the chart visualization is reduced to a certain threshold size or smaller;
identifying one or more chart elements that do not have default attributes and which are to be modified or hidden from the accessed chart visualization responsive to each triggered optimization;
for each triggered optimization, reducing the overall size of the accessed chart visualization by the given percentage for the triggered optimization, relative to the accessed chart visualization's original size, by modifying or hiding the one or more chart elements that do not have default attributes from the accessed chart visualization in accordance with the triggered optimization;
presenting the reduced accessed chart visualization in an optimized format in which the one or more chart elements that do not have default attributes have been modified or hidden in accordance with the optimization sequence;
as part of the optimized format presenting an interactive control that is associated with at least one modified or hidden chart element; and
in response to detected user input at the interactive control, accessing the at least one modified or hidden chart element.

10. The method of claim 9, wherein the interactive control comprises a selectable link which is operable, when selected, to cause a display of the one or more modified or hidden chart elements.

11. The method of claim 9, wherein the method performed comprises displaying the selectable link within the optimized format for the accessed chart visualization.

12. The method of claim 10, wherein one of the displayed chart elements of the optimized format comprises the selectable link.

13. The method of claim 12, further comprising displaying one or more new chart elements in response to a selection of the selectable link.

14. The method of claim 9, wherein the one or more chart elements includes a label.

15. The method of claim 9, wherein the one or more chart elements includes at least one non-textual graphical chart element.

16. A computing system configured for performing chart visualization optimizations in a progressive manner in response to successively detected triggering events, the computing system comprising:
one or more processors; and
one or more hardware storage device having stored computer-executable instructions which are executable by the one or more processors to cause the computing system to perform the following computer-implemented method:
accessing at a device a chart visualization that includes a plurality of different chart elements, at least some of the different chart elements having display attributes that are modifiable during optimization of the accessed chart visualization, and wherein at least some of the display attributes are set as default attributes that are stored in and accessible through data structures stored in system memory;
in response to an event that requires resizing the accessed chart visualization for a smaller display area on the device, triggering an optimization sequence used to resize the accessed chart visualization for the smaller display area, wherein the optimization sequence comprises:
triggering a first optimization used to resize and reduce the accessed chart visualization by a first given percentage relative to the accessed chart visualization's original size;
successively triggering one or more further optimizations in accordance with the optimization sequence used in order to further resize and reduce the accessed chart visualization by at least a second given percentage relative to the accessed chart visualization's original size; and
wherein chart elements having display attributes that are default attributes are not hidden or modified during the first or any subsequently triggered optimization unless the chart visualization is reduced to a certain threshold size or smaller;
identifying one or more chart elements that do not have default attributes and which are to be modified or hidden from the accessed chart visualization responsive to each triggered optimization;
for each triggered optimization, reducing the overall size of the accessed chart visualization by the given percentage for the triggered optimization, relative to the accessed chart visualization's original size, by modifying or hiding the one or more chart elements that do not have default attributes from the accessed chart visualization in accordance with the triggered optimization;
presenting the reduced accessed chart visualization in an optimized format in which one or more chart elements that do not have default attributes have been modified or hidden in accordance with each optimization of the optimization sequence that is performed;
as part of the optimized format presenting an interactive control that is associated with at least one modified or hidden chart element; and
in response to detected user input at the interactive control, accessing the at least one modified or hidden chart element by generating within the reduced accessed chart visualization that is presented an area that separately displays at least one modified or hidden chart element.

17. The computing system of claim 16, wherein the defaults attributes comprise a single displayed value for a single corresponding chart element.

18. The computing system of claim 16, wherein one or more of the optimizations comprise:
changing a font of at least one chart element, where the font is not a default attribute; and changing the at least one chart element from a non-compact format into a compact format by hiding at least a part of the at least one chart element prior to changing the font of the at least one chart element.

19. The computing system of claim 16, wherein one or more of the optimizations comprise:

hiding one or more label chart elements from the chart visualization, where the one or more label chart elements do not comprise a default attribute; and hiding one or more non-label chart elements, where the one or more non-label elements do not comprise a default attribute, prior to hiding the one or more label chart elements from the chart visualization.

20. The computing system of claim 16, wherein one or more of the optimizations comprise:

hiding a legend which does not comprise a default attribute; and repositioning the legend within the optimized chart visualization prior to hiding the legend.

* * * * *